United States Patent [19]

Oda et al.

[11] Patent Number: 5,677,779
[45] Date of Patent: Oct. 14, 1997

[54] OPTICAL COMMUNICATIONS MODULE

[75] Inventors: Gan Oda; Tomohisa Ishikawa, both of Kawasaki; Yoshimitsu Sakai, Sapporo; Akira Okamoto, Kawasaki; Tatsuro Kunikane, Kawasaki; Tetsuo Watanabe, Kawasaki; Sadayuki Miyata, Kawasaki; Hiroyuki Furukawa, Sapporo, all of Japan

[73] Assignee: Fujitsu Limited, Kawasaki, Japan

[21] Appl. No.: 395,471

[22] Filed: Feb. 28, 1995

[30] Foreign Application Priority Data

Jul. 1, 1994 [JP] Japan .................. 6-150964

[51] Int. Cl.$^6$ .................. H04B 10/00
[52] U.S. Cl. .................. 359/152; 359/163; 359/194; 372/29
[58] Field of Search .................. 359/152, 153, 359/163, 180, 188, 189, 195, 194; 372/29, 30, 31, 32

[56] References Cited

U.S. PATENT DOCUMENTS

| | | | |
|---|---|---|---|
| 4,317,236 | 2/1982 | Bosch et al. | 359/152 |
| 4,471,494 | 9/1984 | Keil et al. | 359/180 |
| 4,796,266 | 1/1989 | Banwell et al. | 372/38 |
| 5,027,434 | 6/1991 | Brahms et al. | 359/152 |
| 5,063,612 | 11/1991 | McKeown | 359/180 |
| 5,268,917 | 12/1993 | Davies | 372/38 |
| 5,317,441 | 5/1994 | Sidman | 359/152 |
| 5,349,462 | 9/1994 | Defranco et al. | 359/152 |
| 5,526,160 | 6/1996 | Watanabe et al. | 359/163 |

OTHER PUBLICATIONS

FJ–B457–DE – Unger Hans–Georg, Optische Nachrichtentechnik, Part II, Huthig Verlag, Heidelberg, 1985, pp. 333, 337, 616–618 ISBN 3–7785–0961–6. (English Abstract).
DE 37 05 698 C2 – Sep. 3, 1987 (H 04 B 10/04 B) (English Abstract).

*Primary Examiner*—Melvin Marcelo
*Assistant Examiner*—Rafael Bacares
*Attorney, Agent, or Firm*—Armstrong, Westerman, Hattori, McLeland & Naughton

[57] ABSTRACT

A compact, low-cost combined transmitting/receiving optical communications module, which is suitable for use in a TCM system and which is capable of normal operation over a particularly wide temperature range in optical communications equipment, is provided. The optical transmitting/receiving section for this purpose has a laser diode which outputs a transmitted optical signal, a combined monitor/receiving photodiode which not only monitors the optical output signal from the laser diode during a transmitting period, but also receives the input optical signal from the transmission path during the receiving period, and an optical mixer/divider which performs transmitting/receiving mixing and dividing between the transmission path, the laser diode, and the photodiode. A drive section has a transmitting/receiving switching circuit which performs time-division transmitting/receiving switching and a threshold control circuit which performs successive control of the bias current of the laser diode so that the optical noise output monitored by the photodiode is maximized.

12 Claims, 25 Drawing Sheets

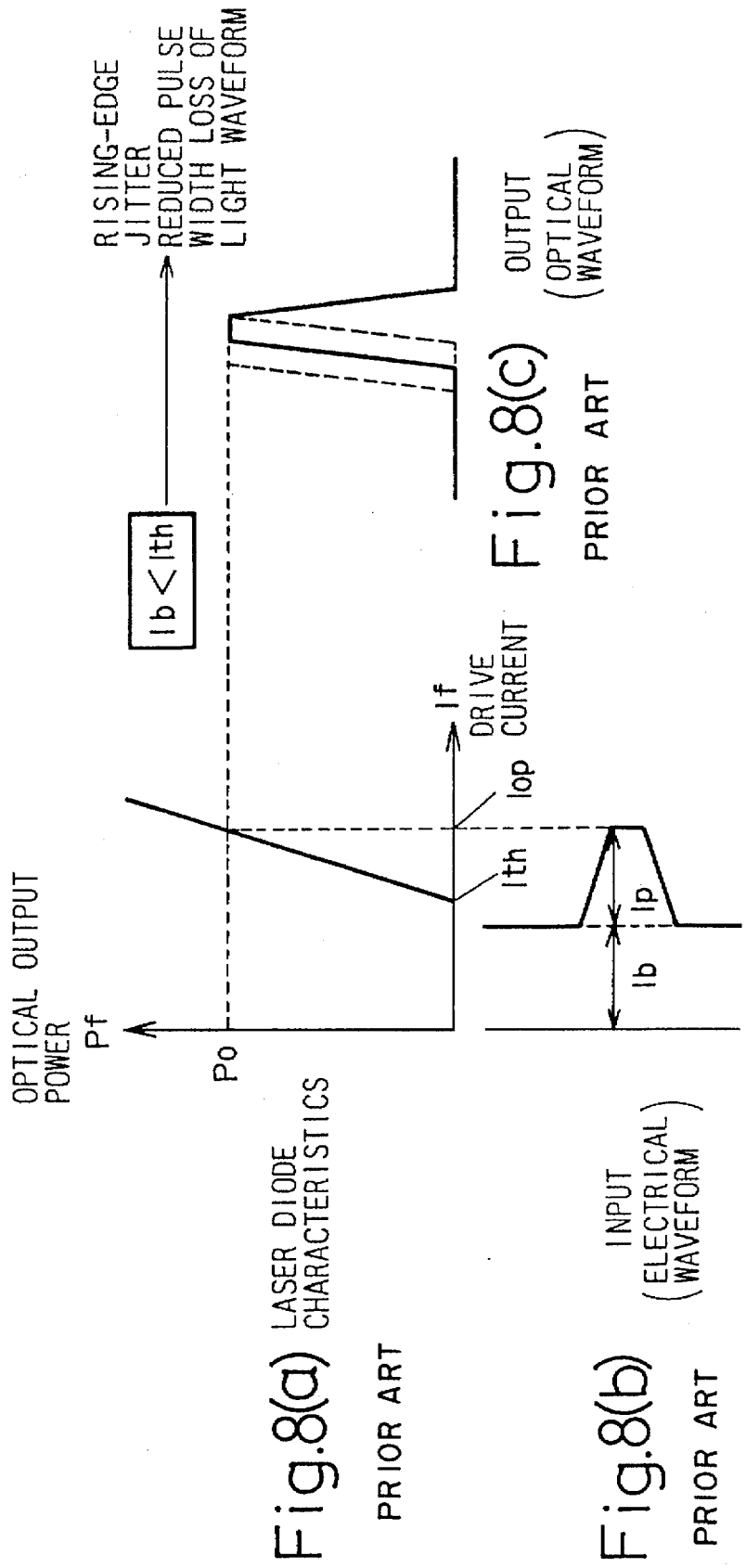
Fig.8(a) LASER DIODE CHARACTERISTICS PRIOR ART
Fig.8(b) INPUT (ELECTRICAL WAVEFORM) PRIOR ART
Fig.8(c) OUTPUT (OPTICAL WAVEFORM) PRIOR ART

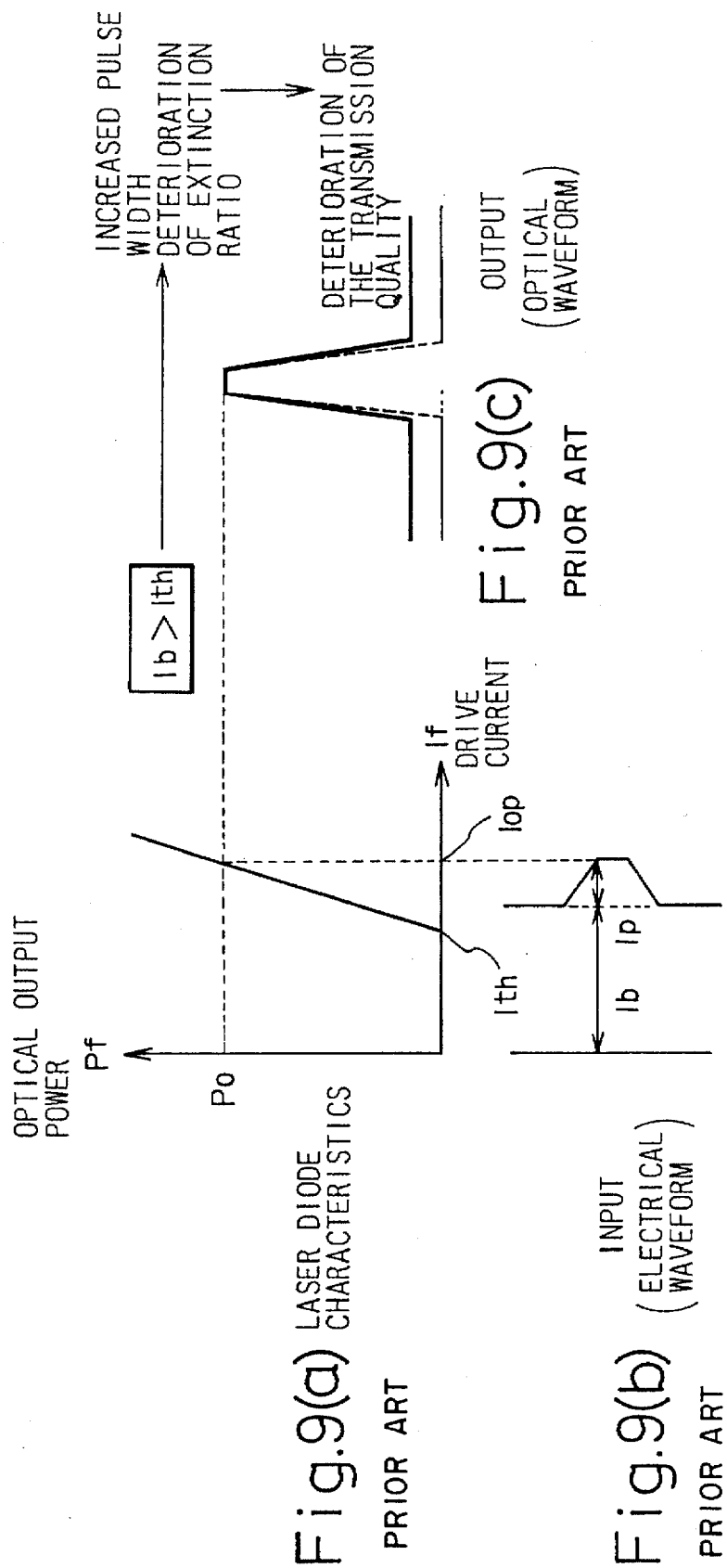

(CURRENT DENSITY NORMALIZED BY THRESHOLD VALUE)

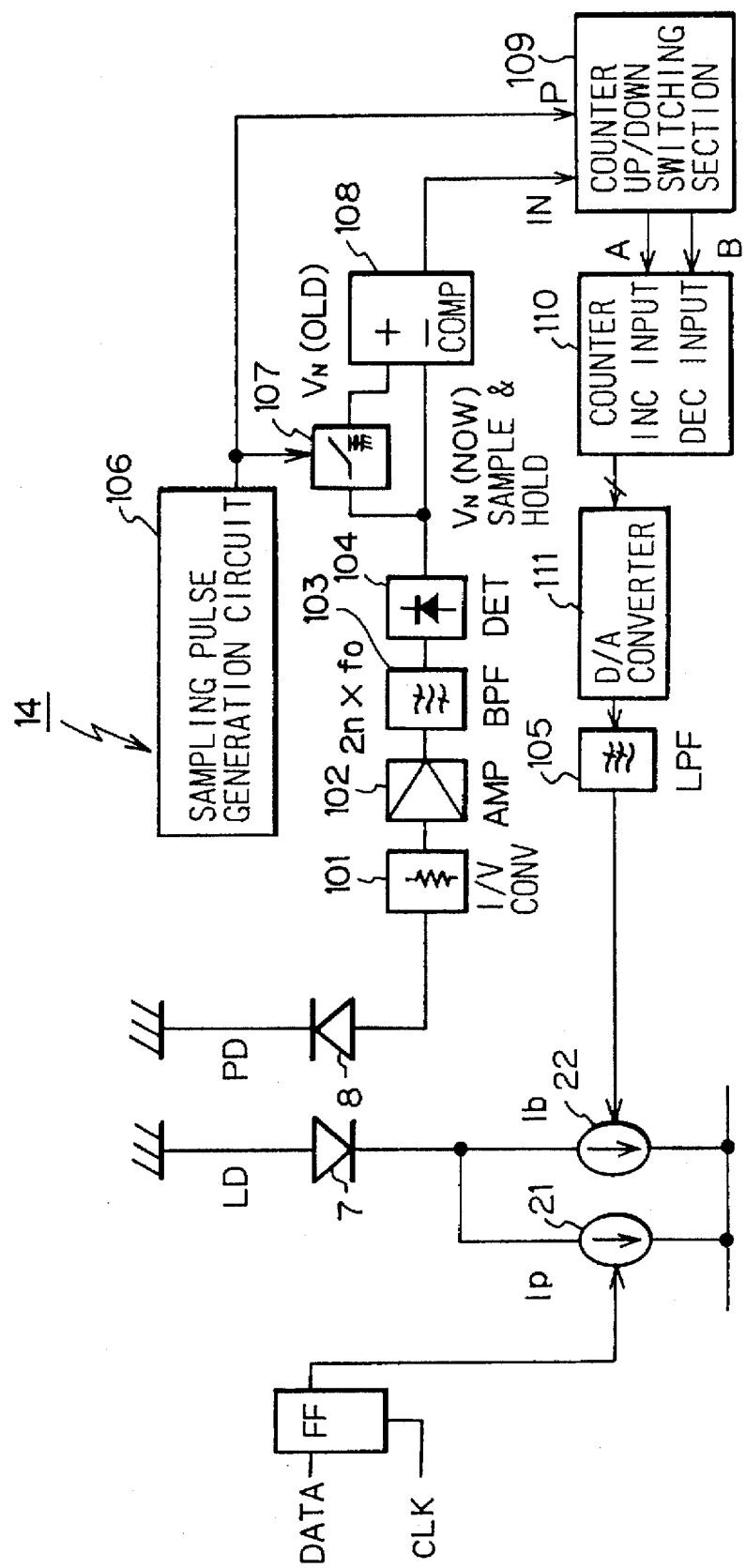

OPTICAL COMMUNICATIONS MODULE

BACKGROUND OF THE INVENTION

1. Field of the Invention

The present invention relates to an optical communications device and, more specifically to an optical communications module for outdoor installation which is required to operate normally over a wide temperature range, and further to a combined receiving/transmitting type optical communications module which is applicable to a TCM (time compression multiplexing) system which performs bi-directional communications along a single fiber cable by means of time-dependent switching between transmitting and receiving.

2. Description of the Related Art

A typical optical communications module used in TCM systems in the past made combined use of the optical fiber transmission path for both transmitting and receiving, by the use of an optical coupler/divider. The transmitting module (laser diode module) consisted of a laser diode (LD) which outputs an optical signal to the transmission path via the optical coupler/divider and a photodiode (PDm) for the purpose of monitoring the optical signal. The receiving module (PD module) consisted of a photodiode (PDr) which received the optical signal from the transmission path via an optical coupler/divider.

In the drive circuits for the LD module and PD module, an LD driver drives a laser diode within the LD module in accordance with the input electrical signal. Part of the output signal from the laser diode is received by a photodiode and is applied to an APC (automatic power control) circuit in the drive circuit of the module. The APC circuit monitors the output signal of the laser diode, and controls the drive current of the LD driver so that the output power is constant. A threshold value circuit (VT) which is added to the APC circuit provides the drive threshold current when driving the laser diode.

The signal from the PD module is amplified by means of a pre-amplifier, the amplified signal being then applied to the next stage, which is an AGC (automatic gain control) circuit. The AGC circuit performs feedback control of the gain of the pre-amplifier so as to maintain a constant received signal level, the output of this circuit being applied to the next circuit, which is a timing recovery/decision circuit. This timing recovery/decision circuit extracts the receive clock from the input signal, and uses this clock to waveshape the received signal. The clock and the signal are then output externally.

In the configuration of the APC circuit, the monitor current from PDm is converted to a voltage, and the resulting monitor voltage is passed through a lowpass filter to change it to a DC level. A subtractor is used to detect the error between the DC voltage and a reference voltage, this error voltage being applied to a current source (Ip) to adjusting LD current so that the output power is held constant. In the threshold value circuit, a temperature-sensing device detects the temperature of the LD module, and the temperature compensation circuit uses a conversion table, for example, between detected temperature and bias current values to convert the detected temperature to a bias value. An Ib generation circuit controls the current source for bias current, in accordance with this converted bias value.

However, in the above-described optical communications module a variety of problems, such as described below, arise.

The first problem arises because of the drive current (If) versus optical output power (Pf) characteristics of the laser diode, which is an opto-electrical conversion device. A laser diode has a conversion characteristic that conforms closely to the relationship $Po=h^* (If-Ith)$. For this reason, the input current is the sum of the bias current from the constant-current bias supply which provides a continuous flow of a current value corresponding to the threshold value (Ith) and the pulse drive current Ip from the constant-current supply for the purpose of providing signal current drive which varies between two values, in accordance with the input data. As a result, an output waveform which is a linear reproduction of the input waveform is obtained. With regard to the latter current component, as described above, APC feedback is applied so that the optical output amplitude is constantly held at a prescribed set value, based on the signal from the PDm optical output monitor photodiode provided within the LD module.

However, because of the temperature dependency of the drive current (If) versus optical output power (Pf) characteristic of the laser diode, in the case in which the temperature either increases or decreases, a problem arises of the optical output waveform changing with respect to the drive waveform. Essentially, the more the temperature rises, the larger will become the threshold (Ith), and the smaller will become the coefficient of conversion, h. While a variation in this coefficient of conversion h is absorbable by the previously described APC loop, the variation in the threshold current was not automatically cancelable in the configuration used in the prior art.

If variations in the threshold value are allowed to occur, when the temperature rises the threshold current of the laser diode increases, bringing about problems of jitter in the rising edge of the output pulses and a reduction in the output pulse width. On the other hand, if the temperature decreases, the threshold current also decreases, this bringing about problems of a reduced pulse width and a deterioration of the pulse extinction ratio due to a superimposed DC component. Therefore, in either case a deterioration is caused in the overall transmission quality, making the module impractical for use as a communications module.

In the past, to solve the above-mentioned problems, the temperature characteristics of the diode were obtained beforehand, either statistically or by actual measurement, and a bias current was applied by an appropriate threshold circuit configuration so as to absorb the temperature-caused variations in the threshold current (Ith).

However, even if the threshold circuit configuration is used, the following problems remain.

<1> Unless the threshold current (Ith) exhibits virtually the characteristics of an exponential function (Ith (Ta)= Igh0* exp (Ta/T0) (where T0 is a characteristic temperature and Ith0 is the threshold value at the characteristic temperature), it is not possible to obtain a good approximation unless different characteristic temperatures are used in the ranges from room temperature to a high temperature and from room temperature to a low temperature, and an implementation of this approximation results in a complex temperature compensation circuit. Also, as described above, if the bias current (Ib) is either excessively large or excessively small with respect to the threshold current (Ith), a deterioration in transmission quality occurs, and the adjustment to achieve compensation for this is extremely difficult.

<2> To achieve precise temperature compensation, it is necessary to determine the temperature characteristics of each individual laser diode, and this leads to an increase in the cost of the laser diodes and the optical modules.

The second problem occurs when the type of optical communications module described above is used in a TCM (time compression multiplexing) system in which bi-directional communications is performed along a single fiber cable, with the direction switching between receiving and transmitting. In the passive double star (PDS) configuration using TCM, which is one type of TCM communication, bi-directional communication is performed between an exchange and a number of subscribers by performing time division multiplexing, to alternate between transmitting and receiving, on a single fiber. This is known as a TCM-TDMA system.

In the system, when making initial system settings, a distance-measurement pulse is sent to each subscriber, the returned pulses being detected to establish the transmission delay to each of the subscribers. Based on the results of this measurement, time slots allowing transmission of data to the exchange are assigned to each subscriber for the purpose of preventing clashes with other subscribers when data is received from the exchange. In this system, an exchange can accommodate a number of subscribers via a star coupler, and this system offers the cost advantage that the exchange can be connected to the star coupler by a single optical fiber.

However, in this case of this system it is necessary that the bias output power from transmitting sections of each of the subscribers be sufficiently small, and if this condition is not satisfied, the bias emission will be superimposed on the weak transmitted signal from a distant subscriber, this resulting in the problem of a reduction in the light intensity ratio in the receiving light, which is used for distinguishing the 1 and 0 levels at the exchange. That is, the extinction ratio of the received pulses is reduced, thereby causing a deterioration of transmission quality.

In addition, in connection with TCM communications, there were problems relating to the achievement of compact and economical laser diode and photodiode modules and with reliable detection of abnormal conditions.

Specifically, in the past, each individual laser diode module and photodiode module was separately implemented as a module, making it difficult to achieve a further reduction in size of the optical transmitting/receiving module. In addition, because separate components where used for transmitting and receiving in the transmitting/receiving module, it was necessary to adjust the transmitting and receiving components individually, this resulting in a problem with manufacturing cost. Furthermore, in the case in which an abnormality occurs in the transmission path, it is necessary for the devices used for receiving and transmission and the terminals to reliably and easily detect a variety of problems. However, with the monitor photodiode used in prior art laser diode modules, only the back light from the laser diode is detected and APC control is performed. For this reason, it was not possible to detect the loss of optical output over the transmission path or deterioration of the laser diode.

In currently used optical modules, three very costly optical semiconductor devices are used: the laser diode and monitor photodiode within the transmitting optical module, and the photodiode for receiving light within the receiving optical module. However, in an optical transmitting/receiving module for a TCM system, which makes use of the time division transmitting/receiving multiplexing feature of the TCM system, it is possible to use the common components in both transmitting and receiving sections, and in particular it is possible to use one and the same photodiode element for both the above-noted monitor monitoring outgoing light emission and detecting incoming optical signal.

By sharing this photodiode in this manner, the element is used as a normal light-receiving photodiode element when receiving, and is used as a photodiode for direct monitoring of the light output sent to the cable from the laser diode element when transmitting.

SUMMARY OF THE INVENTION

An object of the present invention, in consideration of the various problems as described above, is to provide an optical communications module in which the threshold current (Ith) in the transmitting condition is monitored, the bias current (Ib) automatically tracking the monitoring so that the influence of threshold current variations caused by temperature, for example, is eliminated, thereby enabling stable operation over a wide temperature range while providing an optical communications module which requires neither threshold value adjustment nor measurement of laser diode characteristics.

Another object of the present invention is to provide an optical communications module, for use as an optical communications module in a TCM system, in which components such as photodiodes and shared between the receiving module and the transmitting module to achieve a singular configuration, thereby achieving a compact and economical module and, furthermore, by directly monitoring the optical output actually sent to the fiber, also achieving precise fault detection and APC control.

The present invention provides an optical communications module having an optical transmitting/receiving section which sends the transmitted signal to the transmission path as an optical signal and receives an optical signal from the transmission path, and a drive section which applies the transmitted signal to the optical transmitting/receiving section, the received optical signal of this optical transmitting/receiving section being reproduced as the received signal, wherein in the drive section of a threshold control circuit which controls the bias current so that the optical noise output from the laser diode, which is detected by the photodiode for monitoring the output, is provided for the purpose of causing the bias current of the laser diode which outputs the transmitted optical signal in the transmitting/receiving section to track the threshold value.

Also, the present invention provides an optical communications module which outputs a transmitted optical signal to a bi-directional transmission path consisting of a single fiber, this optical communications module having an optical transmitting/receiving section which receives an input optical signal from the transmission path, and a drive section which applies the transmitted signal to the optical transmitting/receiving section, the received optical signal of this optical transmitting/receiving section being reproduced as the received signal, wherein this optical transmitting/ receiving section has a laser diode which outputs the transmitted optical signal, a combination monitor/receiving photodiode which not only monitors the optical output to the transmission path from the laser diode during a transmission period, but which also receives the light from the input optical signal from the transmission path during a receiving period, and an optical mixer/divider which mixes/divides the transmitted/received light between the transmission path and the laser diode and photodiode, and the drive section having a transmitting/receiving switching circuit, which performs time division switching of the transmitting/receiving section between transmitting and receiving.

Also, the present invention provides an optical communications module which outputs a transmitted optical signal to a bi-directional transmission path consisting of a single fiber, this optical communications module having an optical transmitting/receiving section which receives an input optical signal from the transmission path, and a drive section which applies the transmitted signal to the optical transmitting/receiving section, the received optical signal of this optical transmitting/receiving section being reproduced as the received signal, wherein this optical transmitting/receiving section has a laser diode which outputs the transmitted optical signal, a combination monitor/receiving photodiode which not only monitors the optical output to the transmission path from the laser diode during a transmission period, but which also receives the light from the input optical signal from the transmission path during a receiving period, and an optical mixer/divider which mixes/divides the transmitted/received light between the transmission path and the laser diode and photodiode, and the drive section having a transmitting/receiving switching circuit, which performs time division switching of the transmitting/receiving section between transmitting and receiving and a threshold control circuit which performs tracking control of the bias current of the laser diode so that the optical noise output monitored by the photodiode is maximum.

The optical noise of a laser diode (LD) exhibits a characteristic frequency distribution and a bias current/threshold current (Ib/Ith) dependency. The Ib/Ith dependency of the optical noise has a sharp peak at the Ib=Ith, the optical noise exhibiting exponential drop-off about this point as a borderline value, due to an increase and decrease of Ib. Therefore, almost all of the noise component is caused in the period when DATA=0, during which period the laser diode drive current is approximately at the threshold current.

With regard to the frequency distribution of the optical noise, whereas this is nearly constant, with the exception of the region near the relaxation oscillation frequency, the power spectrum of a digital signal having a bit rate of fo ideally has a component of zero at the frequencies 2n*fo (where n is an integer).

Therefore, if the 2n*fo components are extracted from the monitored signal and successive feedback control is performed of the bias current so that the monitored signal (consisting of 2n*fo) noise components) is maximized, it is possible to cause Ib to track Ith with a minimum of interference from the transmitted data.

When the present invention is used in a TCM system in which time switching is performed between transmitting and receiving, in the transmitting/receiving section it is possible to change the positioning of the laser diode element and photodiode element in the previous LD module of the transmitting/receiving section and to add an optical mixer/diver using, for example, a dividing film, thereby enabling use of the photodiode for both receiving and laser diode light output monitoring. By doing this, it is possible not only to achieve a 3-to-2 reduction in the number of optical semiconductor components used, but also to implement the transmitting/receiving module as a single unit which is manufactured by one set of manufacturing processes, thereby achieving both compactness and low cost in manufacturing the transmitting/receiving section. In addition, by monitoring the forward-direction light output by from the laser diode via an optical divider/mixer by means of the photodiode, it is easy to perform accurate detection of output faults caused by, for example, loss of laser diode output or deterioration of the laser diode.

Furthermore, the transmitting/receiving switching circuit performs switching either in accordance with an externally applied transmitting/receiving switching signal or independently, by means of an internal timer. During transmission, the transmitting/receiving switching circuit applies the monitor signal from the photodiode to the APC circuit and above-described threshold control circuit of the present invention which controls the laser diode output so that it is held constant. During receiving, the transmitting/receiving switching circuit sends the received signal from the photodiode to the AGC circuit which maintains the received signal at a constant level. In the latter case, by using a wideband pre-amplifier in the receiving section, it is possible to use the output of the wideband pre-amplifier in the APC circuit. In accordance with the constitution of the present invention, the APC control and threshold control are possible even without a monitor photodiode inside the laser diode module.

BRIEF DESCRIPTION OF THE DRAWINGS

The present invention will be more clearly understood from the descriptions as set forth below, with reference to the following accompanying drawings.

FIG. 8a is a drawing which shows an example of the drive current versus optical output power characteristics of a laser diode at an elevated temperature.

FIG. 8b is a drawing which shows an example of an input waveform.

FIG. 8c is a drawing which shows an example of an output waveform.

FIG. 9a is a drawing which shows an example of the drive current versus optical output power characteristics of a laser diode at an reduced temperature.

FIG. 9b is a drawing which shows an example of an input waveform.

FIG. 9c is a drawing which shows an example of an output waveform.

FIG. 10b is a timing diagram which shows an example of the communications timing in FIG. 10a.

FIG. 11 is a drawing which illustrates the received pulse blanking ratio at the exchange side in the system of FIG. 10a.

FIG. 15 is a circuit block diagram which shows the second embodiment of a threshold control circuit according to the present invention.

FIG. 18b is a timing diagram which shows an example of the operational timing of the circuit shown in FIG. 18a.

FIG. 19b is a drawing which illustrates the operation of the circuit of FIG. 19a.

DESCRIPTION OF THE PREFERRED EMBODIMENTS

Before describing the preferred embodiments according to the present invention, examples of the related art are provided, with reference made to FIGS. 1 to 11.

Figure 1:
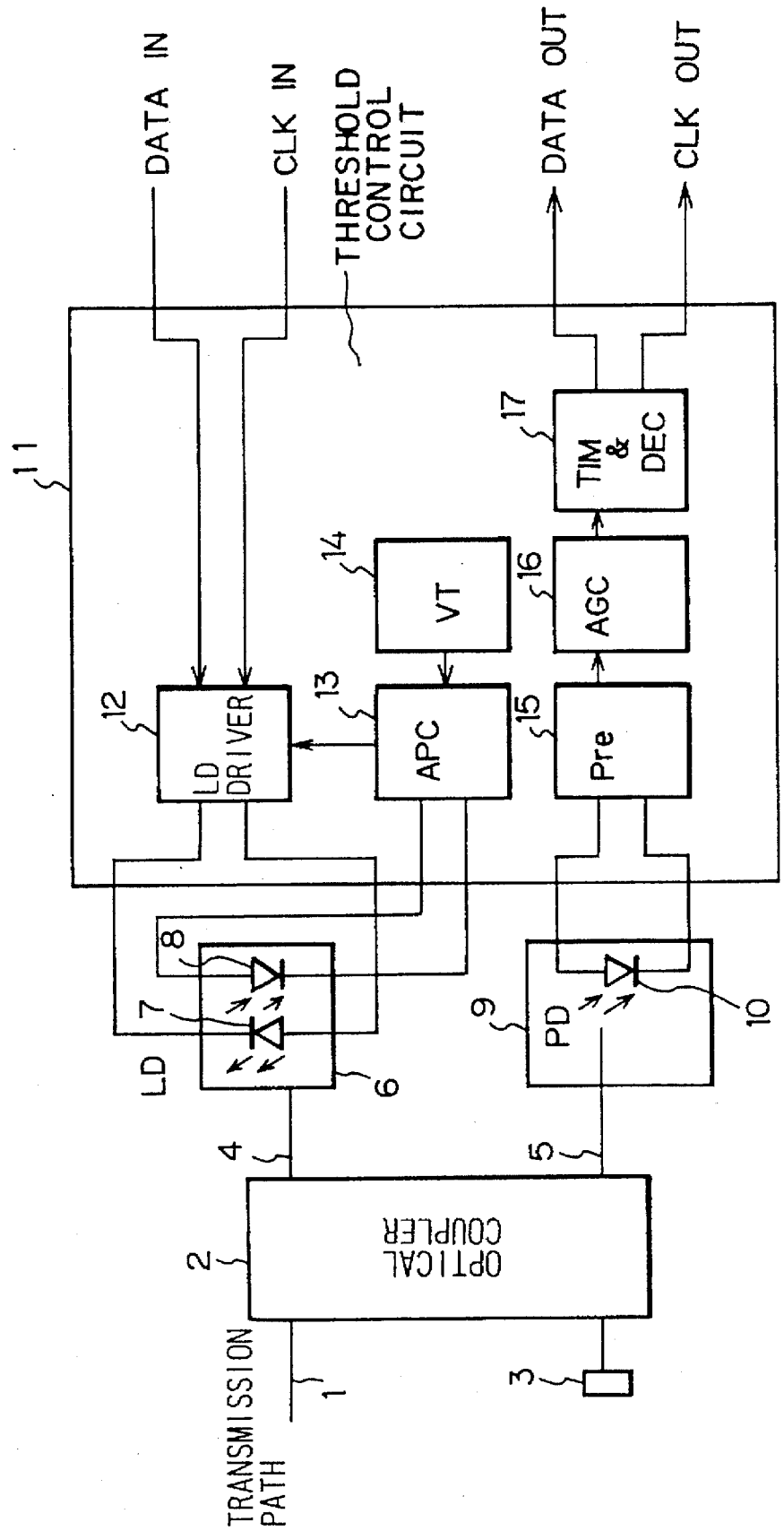
FIG. 1 is a circuit block diagram which shows an example of an optical communications module used in a TCM system in the prior art.

FIG. 1 shows an example of a typical optical communications module of the prior art, used in a TCM system.

In FIG. 1, the optical fiber transmission path 1 is used for both transmitting and receiving, by means of the optical coupler mixer/divider 2. The transmitting module (laser diode module) 6 is formed of the laser diode (LD)7 which sends an optical signal to the transmission path 1 via the optical coupler mixer/divider 2, and the photodiode (PD) 8 which is provided for the purpose of monitoring the optical signal of the laser diode. The receiving module (PD module) 9 is formed of the photodiode (PD) 10 which receives the optical signal via the optical coupler mixer/divider 2. Termination circuit 3 prevents feedback of the signal, from the transmitting side to the receiving side, from occurring within the optical coupler mixer/divider 2 which has four ports.

Figure 2:
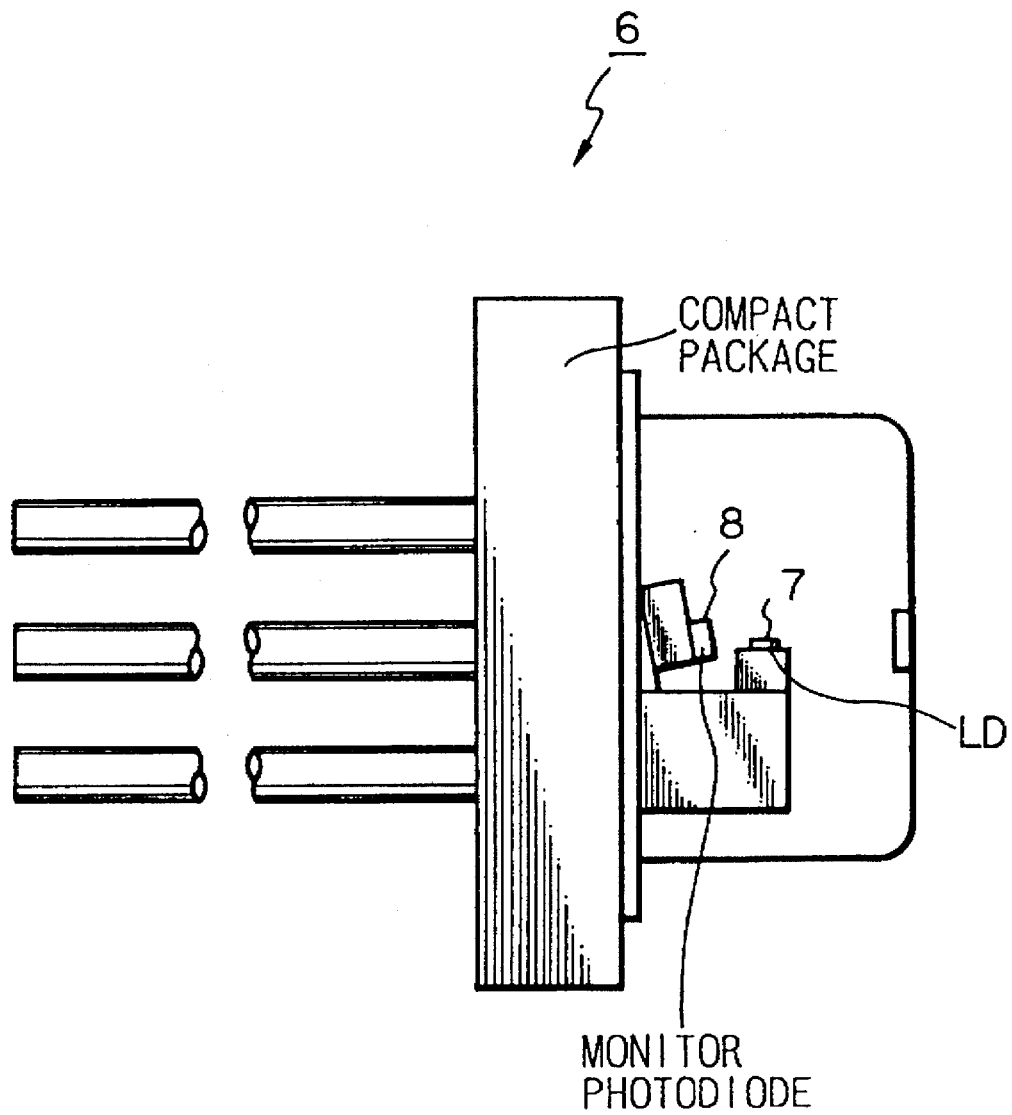
FIG. 2 is a drawing which shows an example of an laser diode module of FIG. 1.

FIG. 2 shows an example of the laser diode module 6. Laser diode 7, which is mounted inside a sealed housing, outputs light from both its front and its back, the light output to the front passing through a lens at the top of the housing and guided to the external optical fiber transmission path, with light emitted to the rear being received by the monitor photodiode 8.

Figure 3:
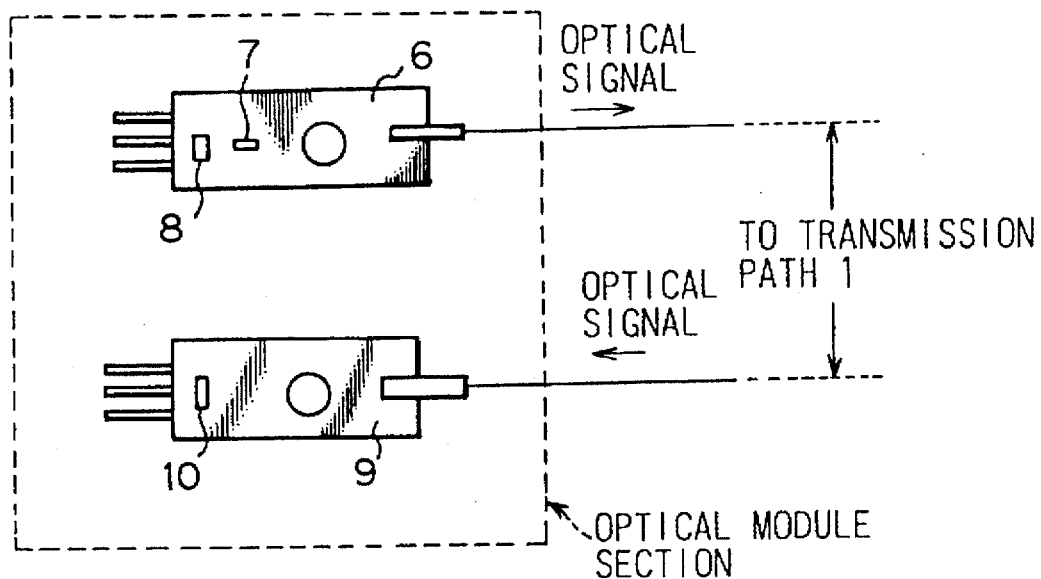
FIG. 3 is a drawing which shows an example of a single optical module which includes the laser diode module and the photodiode module.
Figure 4:
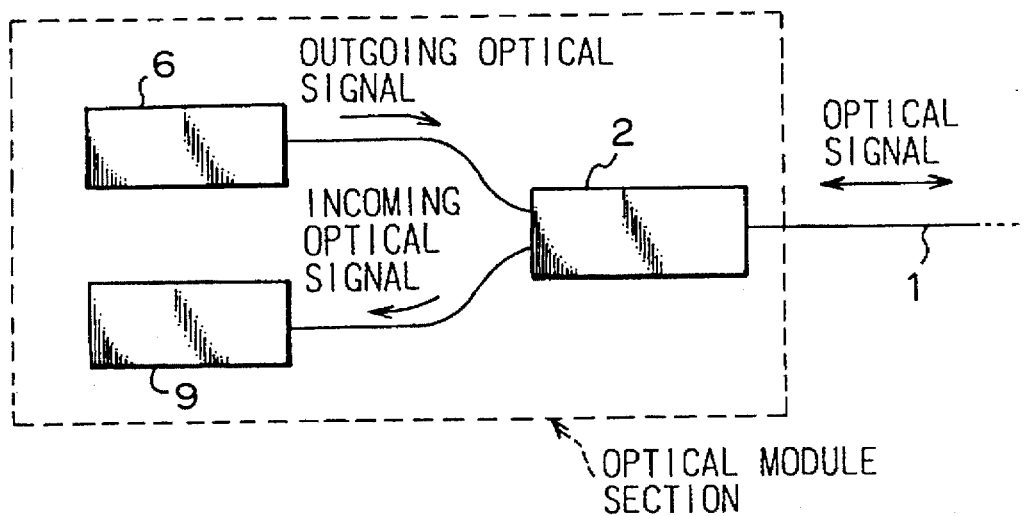
FIG. 4 is a drawing which shows an example of an optical module obtained by adding an optical coupler mixer to the example shown in FIG. 3.

FIG. 3 shows an example of a single optical module section in which both the laser diode module 6 and the photodiode module 9 are included. The circular shapes in this drawing are light-gathering lenses. FIG. 4 shows an example of an optical module section obtained when an optical coupler mixer/divider 2 is added to the optical module section shown in FIG. 3.

Returning to FIG. 1, in the laser diode module 6 and photodiode module 9 drive circuit 11, the laser diode driver 12 drives the laser diode 7 which is inside the laser diode module 6, in accordance with input signals (DATA IN & CLOCK IN). Part of the light output by the laser diode 7 is, as described above, received by photodiode 8, and applied to the APC (automatic power control) circuit 13. The APC circuit 13 monitors the light output by the laser diode 7, and controls the drive to the laser diode driver 12 so that the output power is held constant. The threshold circuit (CT), which is added to the APC circuit 13, provides the drive threshold current when driving the laser diode 7.

The received signal from the photodiode module 9 is amplified by the pre-amplifier (Pre) 15, after which the amplified signal is applied to the next stage, the AGC (automatic gain control) circuit 16. The AGC circuit 16 performs feedback control of the gain of the pre-amplifier 15, so that the received signal level is held constant, and the output signal from this circuit is applied to the next stage, the timing recovering/decision circuit 17. The timing recovering/decision circuit 17 extracts a clock signal from the input signal, and this clock timing to perform waveform returning of the received signal and then outputs these signals externally (DATA OUT & CLK OUT).

Figure 5:
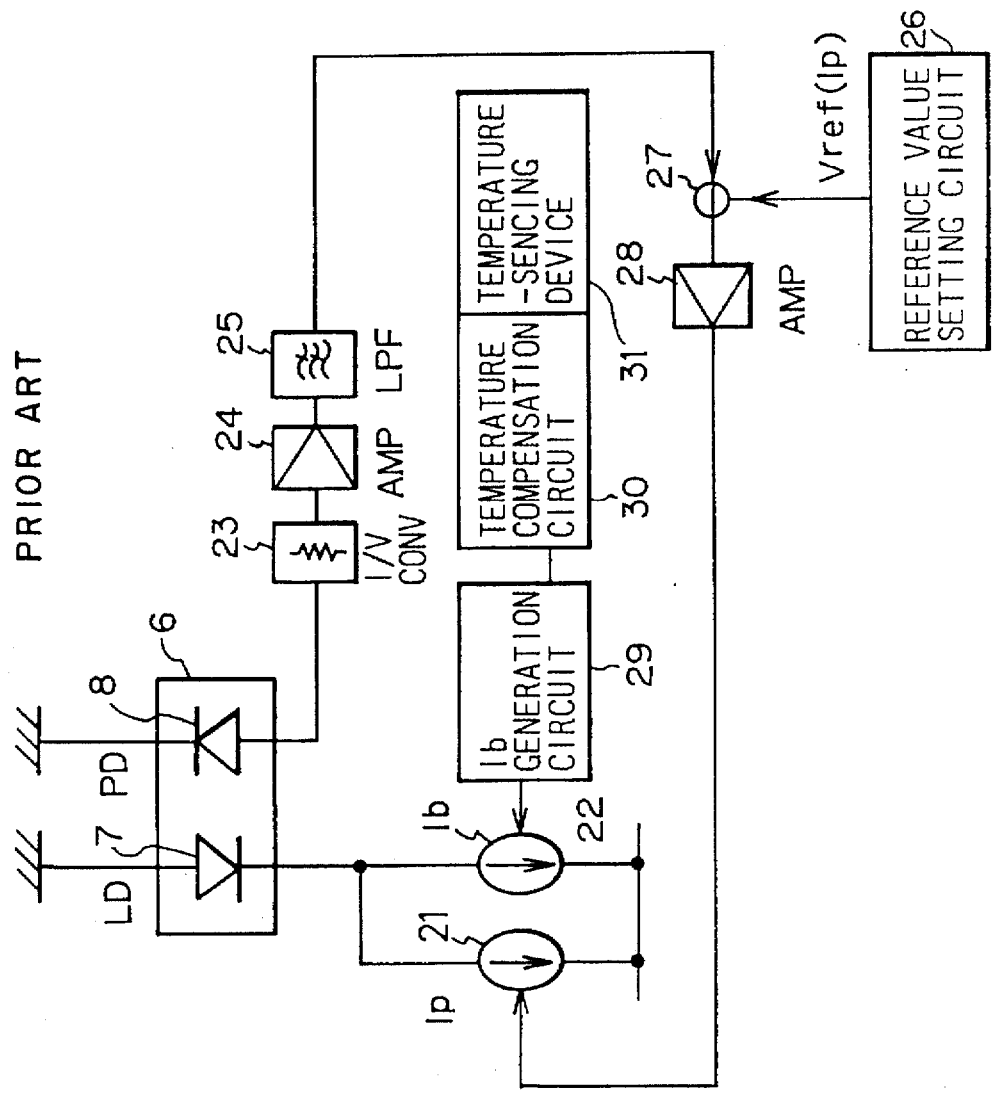
FIG. 5 is a circuit block diagram which shows an example of the circuit configuration of the APC circuit and threshold circuit of FIG. 1.
Figure 6:
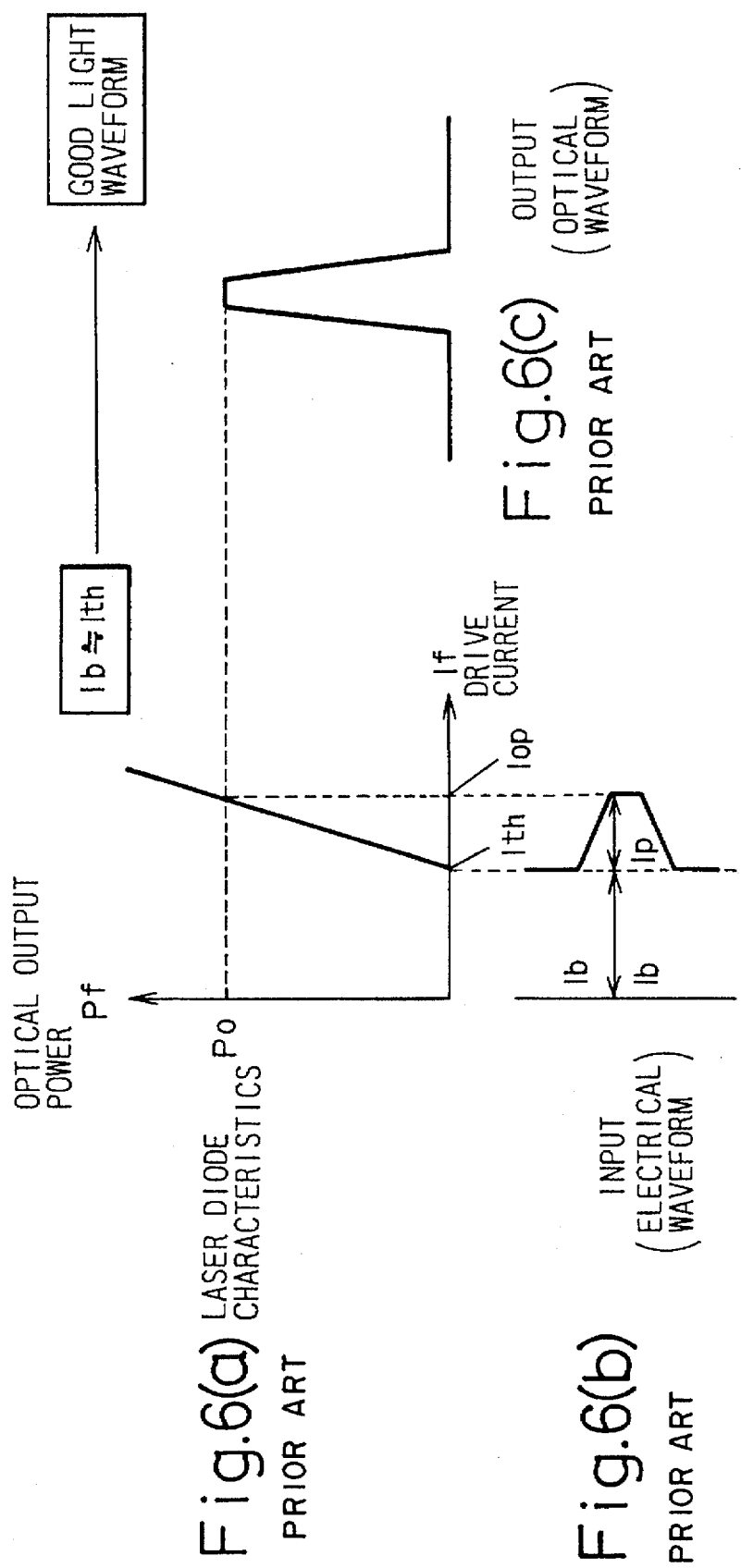
FIG. 6a is a drawing which shows an example of the drive current versus optical output power characteristics of a laser diode.
FIG. 6b is a drawing which shows an example of an input signal waveform.
FIG. 6c is a drawing which shows an example of an output signal waveform.

FIG. 5 is an example of a more detailed block configuration of the APC circuit 13 and threshold circuit 14 of the above-described FIG. 1.

In FIG. 5, the constant-current source (Ip) 21 for the purpose of providing signal current drive and the constant current source (Ib) for the purpose of providing bias current flow to the laser diode 7 correspond to the LD driver 12 shown in FIG. 1. Also, the I/V conversion circuit 23, amplifier (AMP) 23, the lowpass filter (LPF) 25, the subtractor 27, the reference value setting circuit 26, and the amplifier (AMP) 28 in FIG. 5 correspond to the APC circuit shown in FIG. 1. The Ib generation circuit 29, temperature compensation circuit 30, and temperature-sensing device 31 in FIG. 5 correspond to the threshold circuit 14 shown in FIG. 1.

In the configuration of the APC circuit, the I/V conversion circuit 23 converts the monitor current from the photodiode 8 to a voltage, this monitor voltage being amplified to the required level by the amplifier 24, after which it is passed through the lowpass filter 25 and changed to a DC level. The subtractor 27 detects the error between the DC voltage and the reference voltage (Vref (Ip)) provided by the reference value setting circuit 26, this error voltage being amplified by the amplifier 28 and applied to constant-current source (Ip) 21 which is provided for the purpose of providing a signal drive current that is controlled to hold the current constant. In the temperature compensation circuit configuration, the temperature-sensing device 31 detects the temperature of the laser diode module 6, and the temperature compensation circuit 30 uses, for example, a detected temperature versus device current value conversion table to convert the detected temperature to a bias value. The I generation circuit 29 performs drive control of the constant-current source (Ib) 22 which provides bias current, in accordance with the bias value.

However, in an optical communications module as described above, various problems, as described below, arise.

The first problem is caused by the drive current (If) versus optical power output (Pf) characteristics of the laser diode 7 electro-optical conversion device, which are shown in FIGS. 6a to 9c.

FIGS. 6a to 6c show the general drive current (If) versus optical output power (Pf) characteristics of an laser diode 7. As shown in FIG. 6a, the laser diode 7 exhibits conversion characteristics expressed closely by Po=h* (If-Ith), and for this reason, as shown in FIG. 6b, the input current is the sum of the bias current from the constant-current source (Ib), which is constantly provided and corresponds to the threshold current (Ith), and the pulse drive current from the constant-current source (Ip), provided for signal drive, which is varied between two values in accordance with the input data. By doing this, an output waveform is obtained which is a linear representation of the input waveform (FIG. 6c). With regard to the latter component of the input current, based on the signal from the optical output monitoring photodiode 8, which is provided within the laser diode module, APC feedback is applied so that the light output amplitude is held at the set value.

FIGS. 7 to 9c show an example of the temperature dependency of the characteristics shown in FIGS. 6a to 6c.

Figure 7:
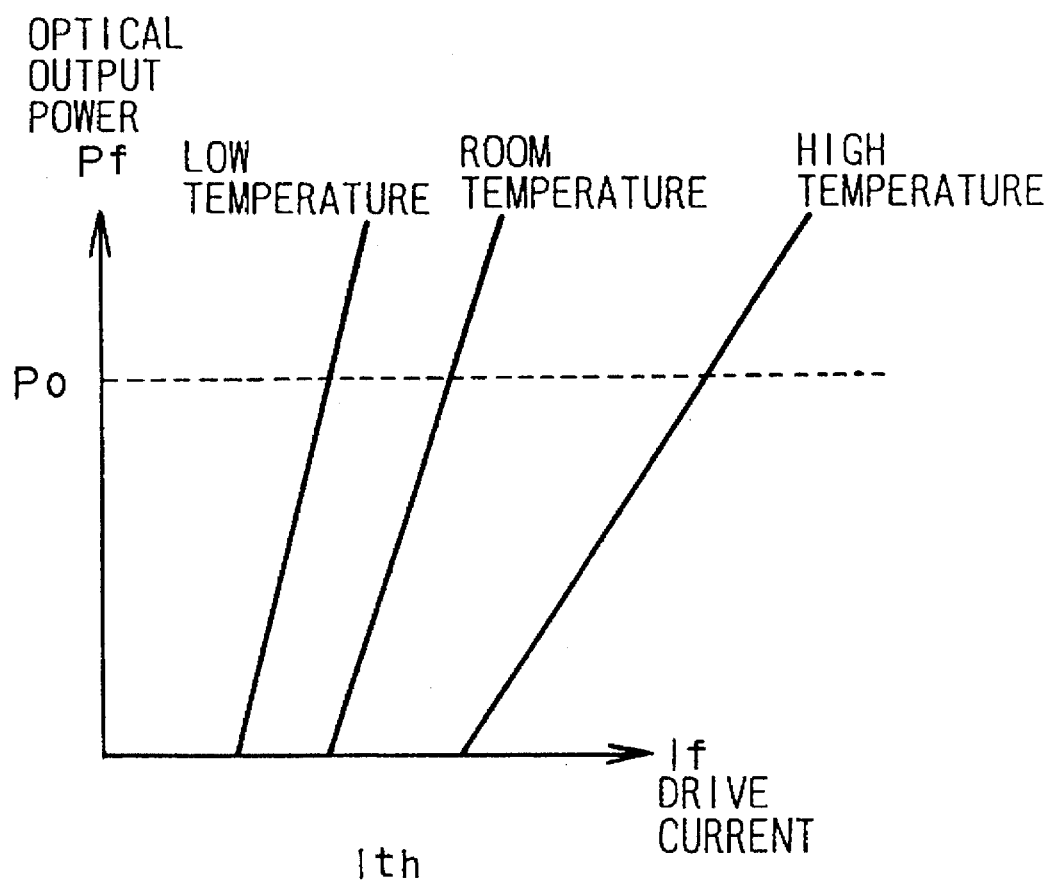
FIG. 7 is a drawing which shows an example of the drive current versus optical output power characteristics of a laser diode.

FIG. 7 shows an example of the temperature-dependent variation of the laser diode drive current (If) versus optical output power (Pf) characteristics shown in FIG. 6a.

FIGS. 8a to 8c show the relationship between drive waveform and the optical output waveform in the case in which the temperature is increased, whereas FIGS. 9a to 9c shown relationship between drive waveform and the optical output waveform in the case in which the temperature is decreased.

As shown in FIG. 7, as the temperature increases the threshold current (Ith) increases, and conversion coefficient h decreases. Of these two, the variation of the conversion coefficient h can absorbed by the APC loop. However, the variation in the threshold current was not amenable to automatic cancellation in the configuration used in the prior art.

If the above-described variations in threshold current are allowed to occur, as shown in FIGS. 8a to 8c, when the temperature increases the threshold current of the laser diode 7 increases, this causing problems such as rising-edge jitter in the output pulse and a reduction in the output pulse width. If, on the other hand, the temperature decreases, as shown in FIGS. 9a to 9c, the threshold current decreases, this causing a reduction in pulse width and a worsening of the pulse blanking ratio caused by a superimposed DC component. In either case, variety of problems arise which lead to a deterioration of transmission quality, thereby preventing practical use of the module as a communications module. For that reason, it was usual to obtain the temperature characteristics of the diode beforehand, either statistically or by actual measurement of the temperature characteristics of the diode to be used, a bias current being applied in accordance with, for example, a threshold circuit having the configuration as shown in FIG. 5, so as to absorb the temperature-caused variations in the threshold current (Ith).

However, even if the threshold circuit configuration is used, the following problem remained.

<1> Unless the threshold current (Ith) exhibits virtually the characteristics of an exponential function (Ith (Ta)= IghO* exp (Ta/TO) (where TO is a characteristic temperature and IthO is the threshold value at the characteristic temperature Ta=0° K.), it is not possible to obtain a good approximation unless different characteristic temperatures are used in the ranges room temperature to high temperature and room temperature to low temperature, and a circular implementation of this approximation results in a complex temperature compensation circuit. Also, as shown in FIGS. 8a to 8c and FIGS. 9a to 9c, if the bias current (Ib) is either too small or too large with respect to the threshold current (Ith), a deterioration in transmission quality results and an adjustment to achieve compensation for this is extremely difficult to perform.

<2> To achieve precise temperature compensation, it is necessary to determine the temperature characteristics of each individual laser diode, and this leads to an increase in the cost of laser diodes and optical modules.

Figure 10A:
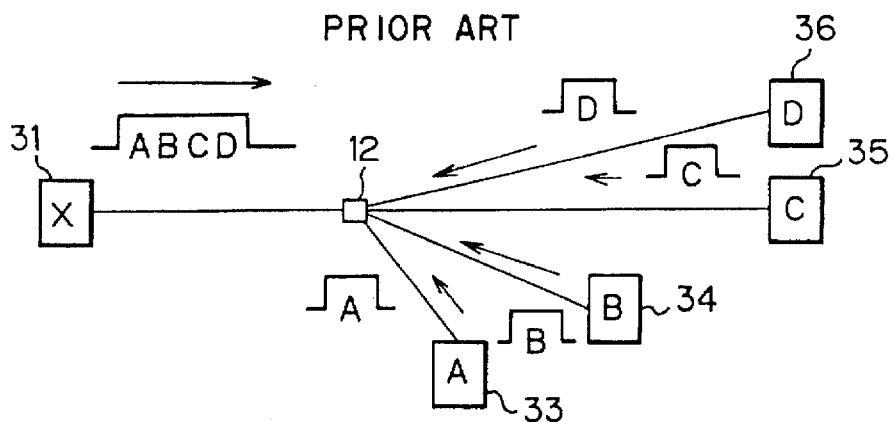
FIG. 10a is a drawing which illustrates the TCM communications system.
Figure 10B:
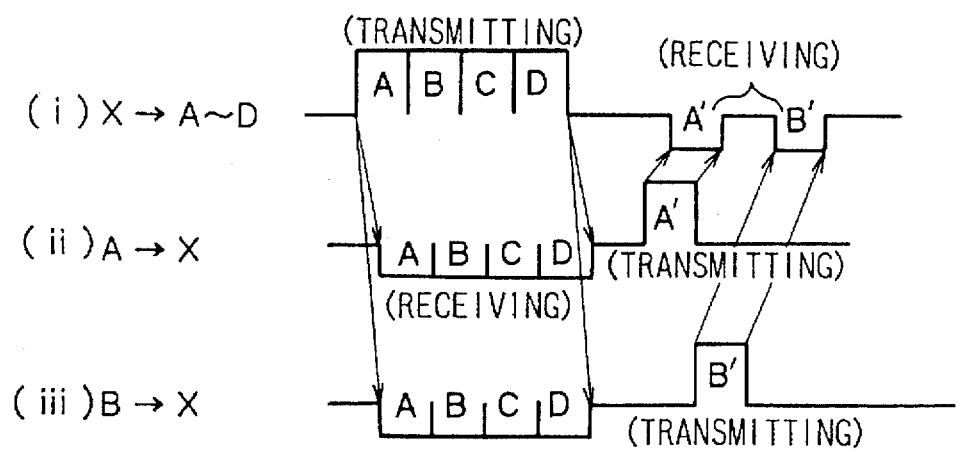

The second problem occurs when the type of optical communications module described above is used in a TCM (time compression multiplexing) system in which bi-directional communications is performed along a single fiber cable, with time switching performed between receiving and transmitting. First, what follows is a simplified description of the TCM communications system, making reference to FIGS. 10a and 10b, which illustrate this communications system. At present, a variety of topologies are used for optical subscriber transmission paths. FIG. 10a shows the passive double start (PDS) configuration, in which is one of the configurations used with TCM systems. In this configuration, bi-directional communications is performed over a single fiber. As shown in FIG. 10b, bi-directional communications is performed between an office (X) and a number of subscribers (A to D) by performing time division multiplexing to alternate between transmitting and receiving along a single fiber. This is known as a TCM-TDMA system.

In this system, when making initial system settings, the exchange (X) 31 sends a distance-measurement pulse to each subscriber (A to D) 33 to 36, the returned pulses being received to establish the transmission delay to each of the subscribers. Based on the results of this measurement, time slots allowing transmission of data to the exchange 31 are assigned to each subscriber 33 to 36 so that signals from subscribers do not collide with each other at office (X).

In FIG. 10b, (i) illustrates transmission of data from the exchange 31 to each of the subscribers 33 to 36, (ii) illustrates transmission of data from subscriber (A) 31 to the exchange 31, and (iii) illustrates transmission of data to the exchange 31 by subscriber (B) 34.

In this system, an exchange can accommodate a large number of subscribers 33 to 36 via a star coupler 32, and this system offers the cost advantage that the exchange 31 can be connected to the star coupler 32 by a single optical fiber.

However, in this case of this system, if the bias level emission output from the transmitting sections of each of the subscribers 33 to 36 is not sufficiently small, thus the bias emission will be superimposed on the weak transmitted signal from a distant subscriber, this resulting in the problem of a possible reduction in the 1-to-0 light extinction ratio in the light received at the exchange. That is, the optical extinction ratio of the received pulses is reduced, thereby causing a great deterioration of the transmission quality.

Figure 11:
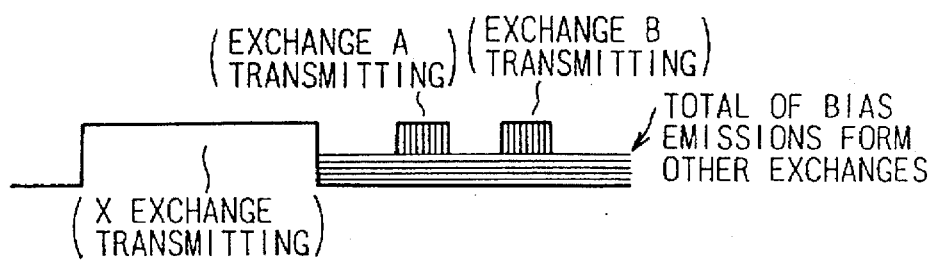

FIG. 11 shows the above-described deterioration of the received pulse extinction ratio at the exchange.

Specifically, as shown in FIG. 3 and FIG. 4, in the past, both the laser diode module 6 and the photodiode module 9 were separately implemented as modules, making it difficult to achieve a further reduction in size of the optical transmitting/receiving module. In addition, in terms of manufacturing, because separate components were used for transmitting and receiving in the transmitting/receiving module, it was necessary to align optical components individually transmitting and receiving, this resulting in a problem with the manufacturing cost.

Furthermore, in the case in which an abnormal condition occurs in the transmission path, it is necessary for the devices used for receiving and transmission and the terminals to reliably and easily detect a variety of problems. However, as shown in FIG. 2, with the prior art monitor photodiode element 8 in the laser diode module 6, only the back light from the laser diode is detected and APC control is performed. For this reason, it was not possible to detect the loss of forward optical output to the transmission path or deterioration of the laser diode. Therefore, it was not possible to detect the condition in which there was not light output from the laser diode element 7 in the forward direction but in which there was light being output from the back of the element.

In currently used optical modules as described above, three very costly optical semiconductor devices are used: the laser diode and monitor photodiode within the transmitting optical module, and the photodiode for receiving light within the receiving optical module. However, for use in an optical transmitting/receiving module for a TCM system, making use of the time division transmitting/receiving multiplexing switching feature of the TCM system, it is possible to the same common components for both transmitting and receiving sections, and in particular it is possible to use one and the same photodiode element for both the monitor photodiode element in the transmitting optical module and the photodiode element in the receiving optical module.

By sharing this photodiode in this manner, the element is used as a normal light-receiving photodiode element when receiving, and is used as a photodiode for direct monitoring of the light output sent to the cable from the laser diode element when transmitting.

Figure 12:
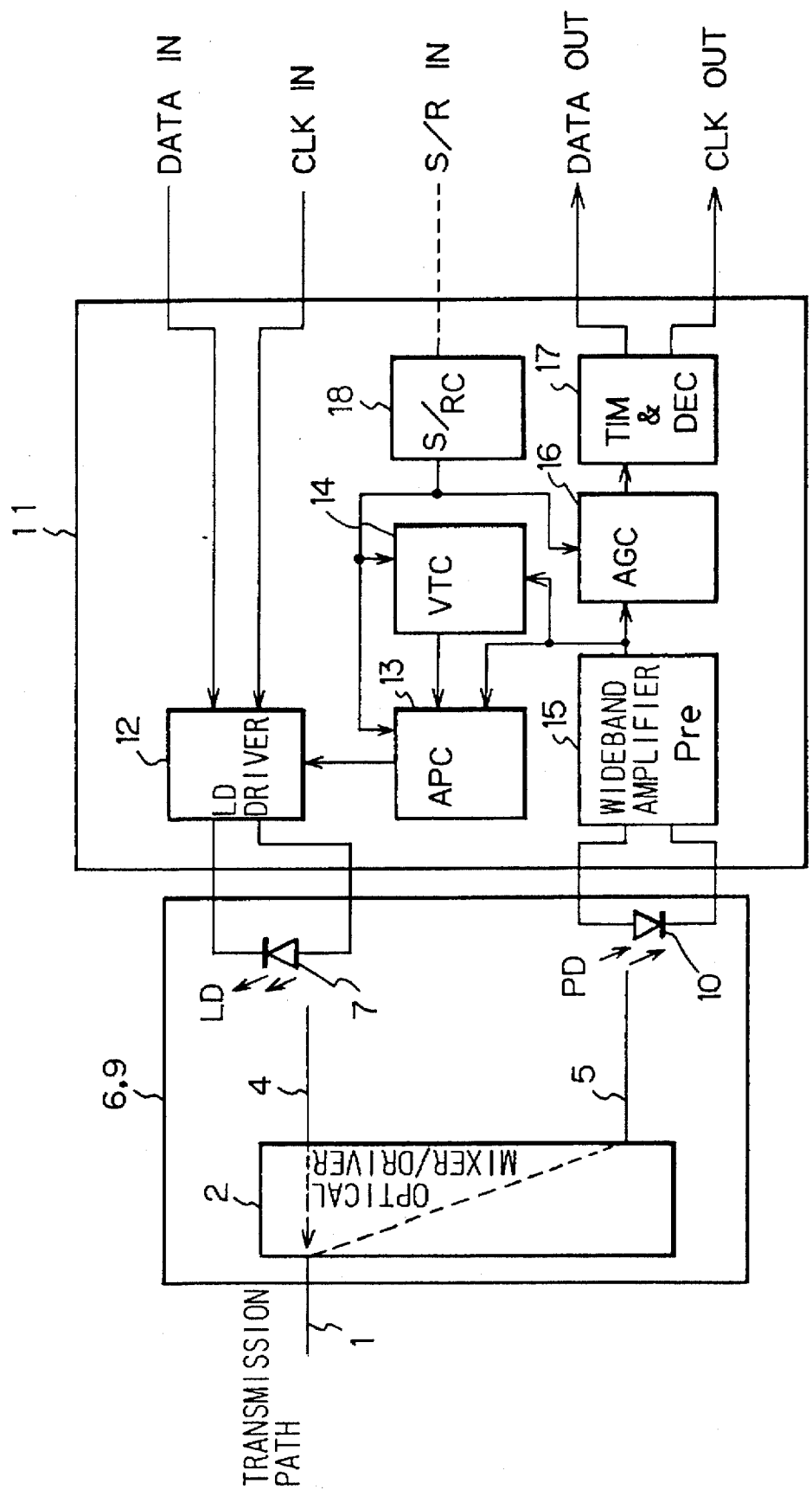
FIG. 12 is a circuit block diagram which shows the basic configuration of an optical communications module according to the present invention.

FIG. 12 shows the basic configuration of an optical communications module according to the present invention. In FIG. 12, to aid in an understanding of this module, elements which are functionally equivalent to elements in the prior art example have been assigned the same reference symbols as in the prior art example.

According to the present invention, the optical communications module has a transmitting/receiving section 6,9 which sends the transmitted signal to the transmission path 1 as an optical signal and receives an optical signal from the transmission path, and a drive section 11, which applies the transmitted signal to the transmitting/receiving section and reproduces the received optical signal as the received signal, this drive section 11 having a threshold control circuit 14 which controls the bias current of the laser diode 7 so that the optical noise output from the laser diode 7 which is detected by the photodiode 10 which monitors the light output is maximized, thereby causing the bias current of the laser diode 7 to track the threshold current value.

In addition, according to the present invention, the optical communications module has a transmitting/receiving section 6,9 which outputs the transmitted signal to the bi-directional transmission path 1 which consists of a single fiber, and a drive section 11, which applies the transmitted signal to the transmitting/receiving section and reproduces the received optical signal as the received signal, the transmitting/receiving section 6,9 having a laser diode 7 which outputs the transmitted signal, a monitor/receiving photodiode 10 which not only monitors the light output from the laser diode 7 to the transmission path 1 during the transmitting period but also receives the input optical signal from the transmission path during the receiving period, and an optical mixer/divider 2 which performs mixing and dividing of the received and transmitted light between the laser diode 7 and the photodiode 10, and the drive section 11 having a transmitting/receiving switching circuit 18 which controls the time-division transmitting/receiving switching of the transmitting/receiving section 6,9.

In addition, according to the present invention, the optical communications module has a transmitting/receiving section 6,9 which outputs the transmitted signal to the bi-directional transmission path 1 which consists of a single fiber, and a drive section 11, which applies the transmitted signal to the transmitting/receiving section and reproduces the received optical signal as the received signal, the transmitting/receiving section 6,9 having a laser diode 7 which outputs the transmitted signal, a monitor/receiving photodiode 10 which not only monitors the light output from the laser diode 7 to the transmission path 1 during the transmitting period but also receives the input optical signal from the transmission path during the receiving period, and an optical mixer/divider 2 which performs mixing and dividing of the received and transmitted light between the laser diode 7 and the photodiode 10, and the drive section 11 having a transmitting/receiving switching circuit 18 which controls the time-division transmitting/receiving switching of the transmitting/receiving section 6,9 and a threshold control circuit 14 which performs successive control of the bias current of the laser diode 7 so that the optical noise output monitored by the photodiode 10 is maximized.

Figure 14A:
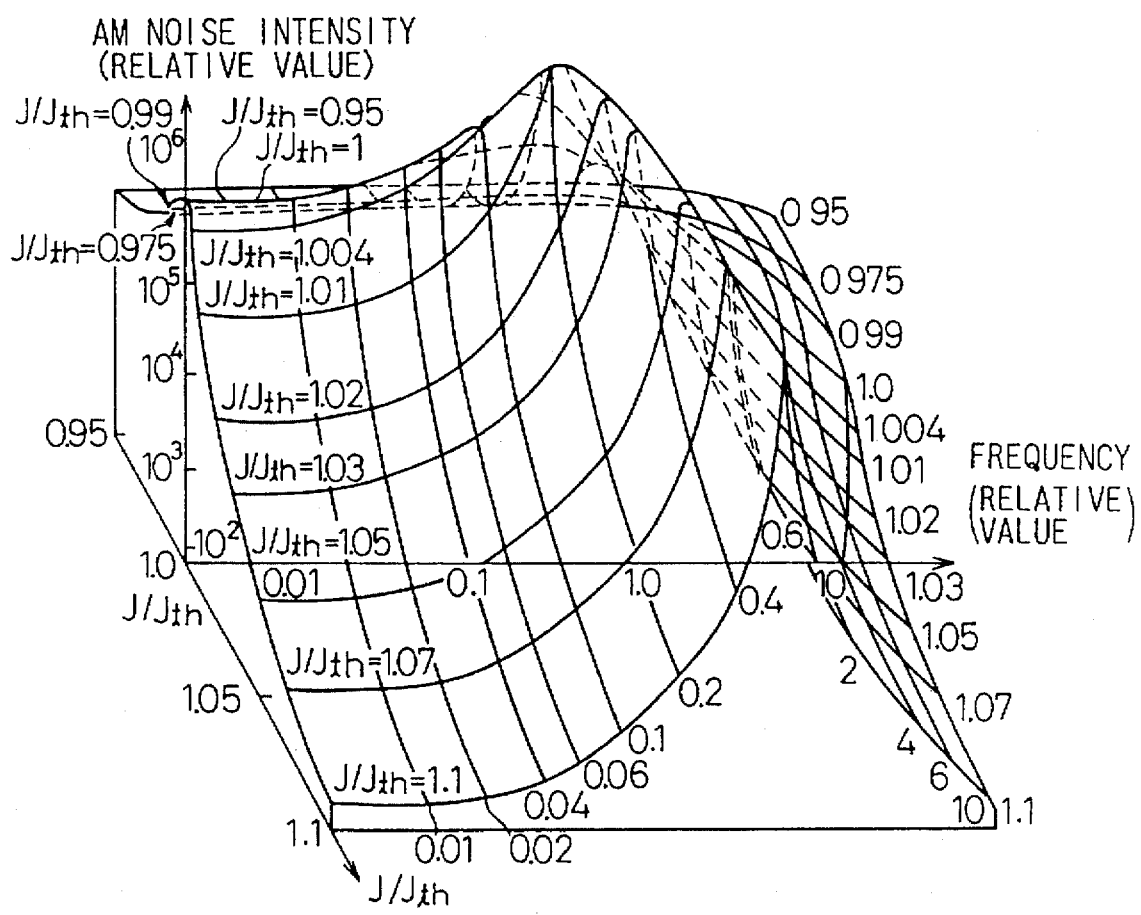
FIG. 14a is a diagram which shows an example of the current dependency and frequency characteristics of the optical noise of a laser diode.
Figure 14B:
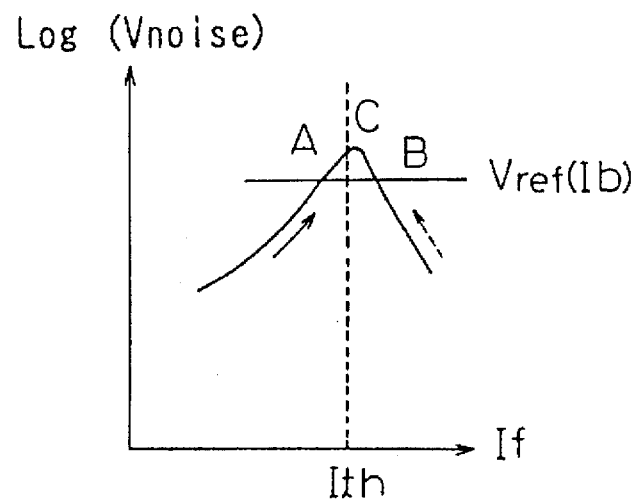
FIG. 14b is a drawing which illustrates the method of determining the Ith peak value.

The optical noise of the laser diode (LD) exhibits the certain frequency distribution and bias current/threshold current (Ib/Ith) dependency as shown in FIGS. 14(a) and 14(b). The Ib/Ith dependency of the optical noise has a sharp peak at Ib=Ith, the optical noise exhibiting exponential drop-off about this point as a borderline value, due to an increase and decrease of Ib. Therefore, almost all of the noise component is caused in the period when DATA=0, during which period the laser diode drive current is approximately at the threshold current.

With regard to the frequency distribution of the optical noise, whereas this is nearly constant, with the exception of the region near the relaxation oscillation frequency, the power spectrum of a digital signal having a bit rate of fo ideally has a value of zero at the frequencies 2n*fo (where n is an integer).

Therefore, if the 2n*fo components are extracted from the monitored signal and the successive feedback control is performed of the bias current so that the monitored signal (consisting of 2n*fo) noise components) is maximized, it is possible to cause Ib to track to Ith with a minimum of interference from the transmitted data.

According to the present invention, when the present invention is used in a TCM system in which time switching is performed between transmitting and receiving, in the transmitting/receiving section, it is possible to change the positions of the laser diode element and photodiode element in the previous LD module of the transmitting/receiving section and to add an optical mixer/diver 2 using, for example, coating dividing lights thereby enabling use of the photodiode 10 for both receiving and laser diode light output monitoring. By doing this, it is possible not only to reduce the number of optical semiconductor components from a 3 to 2, but also to implement the transmitting/receiving module as a single unit which is manufactured by one set of manufacturing processes, thereby achieving both compactness and low cost in manufacturing the transmitting/receiving section. In addition, by monitoring the forward-direction light output to the fiber from the laser diode 7 via an optical divider/mixer 2 by means of the photodiode 10, it is easy to perform accurate detection of output faults caused by, for example, loss of laser diode 7 output or deterioration of the laser diode 7.

Furthermore, the transmitting/receiving switching circuit 18 performs switching either in accordance with an externally applied transmitting/receiving switching signal or internally automatically, by means of an internal timer. During transmission, the transmitting/receiving switching circuit 18 applies the monitor signal from the photodiode 10 to the APC circuit 13 and above-described threshold control circuit 14 of the present invention controls the laser diode output so that it is held constant. During receiving, the transmitting/receiving switching circuit 18 applies the received signal from the photodiode 10 to the AGC circuit 16 which maintains the received signal at a constant level. In the latter case, by using a wideband pre-amplifier 15 in the receiving section, it is possible to use the output of the wideband pre-amplifier 15 in the APC circuit 13. In accordance with the constitution of the present invention, the APC control and threshold control are possible even without a monitor photodiode inside the laser diode.

Figure 13:
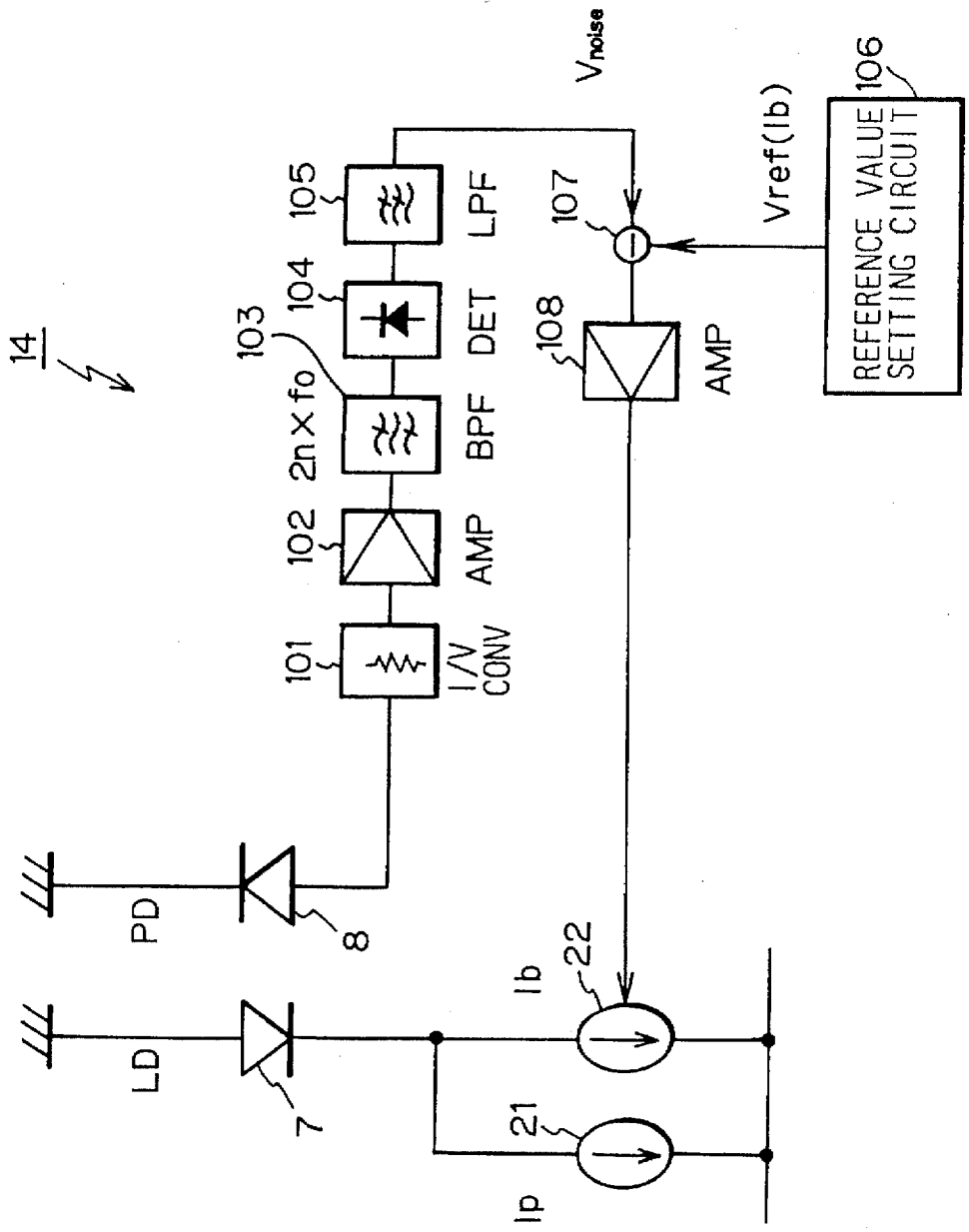
FIG. 13 is a circuit block diagram which shows the first embodiment of a threshold control circuit according to the present invention.

FIG. 13 shows the first embodiment of a threshold control circuit 14 part of the present invention, this drawing showing the basic circuit block configuration. Elements which are the same as elements of the prior art threshold circuit and which have already been described have been assigned the same reference symbols. (This applies as well to the drawings of other embodiments of this threshold control circuit to be presented later.)

The difference in this threshold circuit with respect to the prior art threshold circuit explained using FIG. 5 to is the elimination of the temperature-sensing device 31, the temperature compensation circuit 30, and the Ib generation circuit 29 of the prior art, and the addition in their place of a feedback loop having approximately the same circuit configuration as the APC circuit.

Specifically, the threshold control circuit 14 according to the present invention has a monitor photodiode 8 which converts the light from the laser diode 7 to a monitor current, an I/V conversion circuit 101 which converts the monitor current to a voltage, an amplifier circuit 102 which amplifies the output of the I/V conversion circuit 101, a bandpass filter 103 which extracts the even 2n*fo components of the bit rate fo from the output of the amplifier circuit 102, an AM detection circuit 104 which performs envelope detection of the output of the bandpass filter 103, a lowpass filter 105 for the purpose of smoothing the variations (transmitted data and mark ratio instantaneous fluctuations) in the AM detector circuit 104 output, a reference value setting circuit 106 which provides the required reference value, a subtractor 107 which determines the error difference between the reference value and the output of the lowpass filter 105, and an error amplifier circuit 108 which amplifies the error.

Figure 14C:
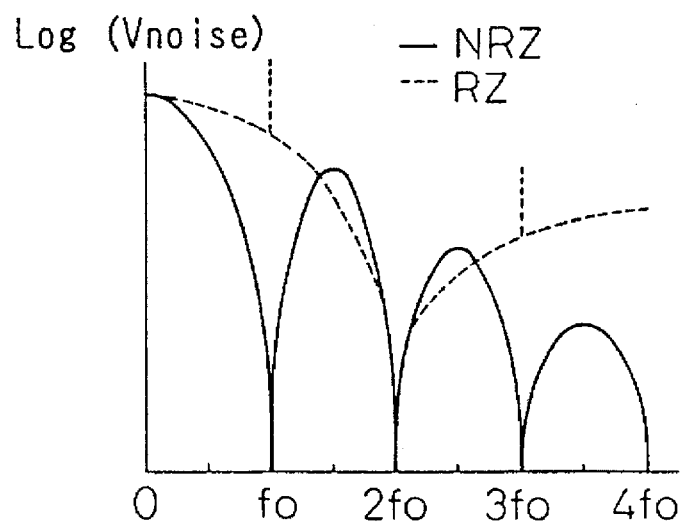
FIG. 14c is a drawing showing an example of the power spectrum of a transmitted digital signal.

FIGS. 14a to 14c show the current dependency and frequency characteristics of the optical noise output by a laser diode.

The optical noise of an laser diode, as shown in FIG. 14a, exhibits dependency with respect to the ratio of the bias current to the threshold current (Ib/Ith) as well as a frequency distribution of this dependency. As can be seen from FIG. 14a, the Ib/Ith dependency of the optical noise has a sharp peak at Ib=Ith, the optical noise exhibiting exponential drop-off about this point as a borderline value, due to an increase and decrease of Ib. Therefore, almost all of the noise component is caused in the period when DATA=0, during which the laser diode drive current is approximately at the threshold current. With regard to the frequency distribution, the laser diode optical noise is nearly constant, with the exception of the region near the relaxation oscillation frequency.

The power spectrum of a transmitted digital signal having a bit rate of fo is as shown in FIG. 14c, ideally has a component of zero at the frequencies 2n*fo (where n is an integer). Therefore, it the 2n*fo components are extracted from the monitored signal and feedback is applied so that the detected output amplitude is maximized, it is extracting only the noise components, and, it is possible to track to Ith with a minimum of interference from the transmitted data. FIG. 14b shows the method of determining Ith, the characteristic curve of this drawing being obtained by viewing FIG. 14a from the left side.

Returning to FIG. 13, the successively updating of the value of Ith using the method shown in FIG. 14b will be described next. Immediately after the start of operation, the bias current of the laser diode 7 is set to the initial value of Ith0. In this condition, because the detected output of 2n*fo components is smaller than the reference value Vref (Ib), feedback is applied in the direction that causes Ib to increase, and Ib approaches Ith(T1) (Tn is the ambient temperature). If, on the other hand, Itho(>Ith(T1)) is set as the initial value, Ib will decrease and will settle in the region of Ith(T1) as described above.

After the bias current Ib settles to Ith(T1) from the initial value Ith0, if the ambient temperature changes from T1 to T2 (where T2>T1), thereby causing an increase in Ith, the Vnoise versus If curve shown in FIG. 14c shifts to the right. If the settling point before the shift was A (that is, if Ib<Ith), shifting the curve to the right due to the increase in temperature, the detected output will drop, so that the feedback of this circuit causes Ib to increase, whereupon it settles once again at C in the region of Ith (T2), this representing automatic adjustment of the bias.

Furthermore, whereas the difference between Ith and the settling points A and B is exaggerated in FIG. 14c, from FIG. 14a, the condition under which the optical noise is approximately halved is in the order of −5% on the If<Ith side and +1% of the If>Ith side. Therefore, even if the extremely simple fixed reference value shown in FIG. 13 is provided, it can be seen that, even allowing for a 50% settling error, it is possible to maintain the bias current value in the very close Ith.

FIG. 15 shows the second embodiment of a threshold control circuit according to the present invention.

While an embodiment of a simplified fixed reference value method was shown in FIG. 13, it is possible to implement the same kind of function as in the example shown below, by using a means such as a counter and D/A converter to cause only a very small variation DIb, and making a comparison of the detected output amplitude before and after the change to perform control so that the bias current tracks to the point at which the optical noise is maximum (~Ith). Such a circuit configuration is shown in FIG. 15, which shows the second embodiment.

In FIG. 15, in place of the reference value setting circuit 106 and the subtractor 107 of FIG. 13, there are a sampling pulse generation circuit 106, a sample & hold circuit 107, which samples and holds the detected output ($V_N(OLD)$), in accordance with a sampling pulse from the sampling pulse generation circuit 106, a comparator 108 which compares the amplitudes of $V_N(OLD)$ and the current detected output ($N_N(NEW)$), a counter 110 which counts the sampling pulses, a counter up/down switching section 109 which instructs the counter 110 to count up or down, and a analog/digital (D/A) converter 111 which converts the output of the counter 110 to an analog value.

In FIG. 15, to simplify the explanation, we will assume that Ib<Ith at the start of operation, and further assume that the output of the counter up/down switching section 109 is instructing the counter to count down (decrement). When the first sampling pulse is generated, Ib is decreased in accordance with the decrement instruction. Simultaneously, the value detected before the decrease in Ib is held in the same & hold circuit 107 by means of a sampling pulse. Because of the condition Ib<Ith, the decrease in Ib results in a decrease in the detected output of the AM detection circuit 104, this resulting in the (+) input of the comparator 108 being higher than the (−) input ($V_N(OLD)>V_N(NEW)$). Because of this condition, the comparator output reverses, thereby indicating incrementing to the counter up/down switching section 109, counter 110 thereby being switched to the count up mode ($V_N(OLD)<V_N(NEW)$).

Thereafter, Ib increases, the increase in Ib causing an increase in the detected output from the AM detection circuit 104 until point C, which is the optical noise peak, is reached, so that the relationship $V_N(OLD)<V_N(NEW)$ is maintained, so that during this period the counter 110 continues to count up. When point C is exceeded, because as Ib increases the detected output decreases ($V_N(OLD)>V_N(NEW)$), the comparator output again reverses, the counter 110 going this time into the count down mode. By doing this, it is possible to achieve settling to the noise output peak (point C) within the minimum change ΔIb, which is established by the accuracy of the D/A converter. Therefore, even if the value of Ith changes due to, for example, temperature variation, the settling operation will be repeated so that Ib≈Ith.

Figure 16:
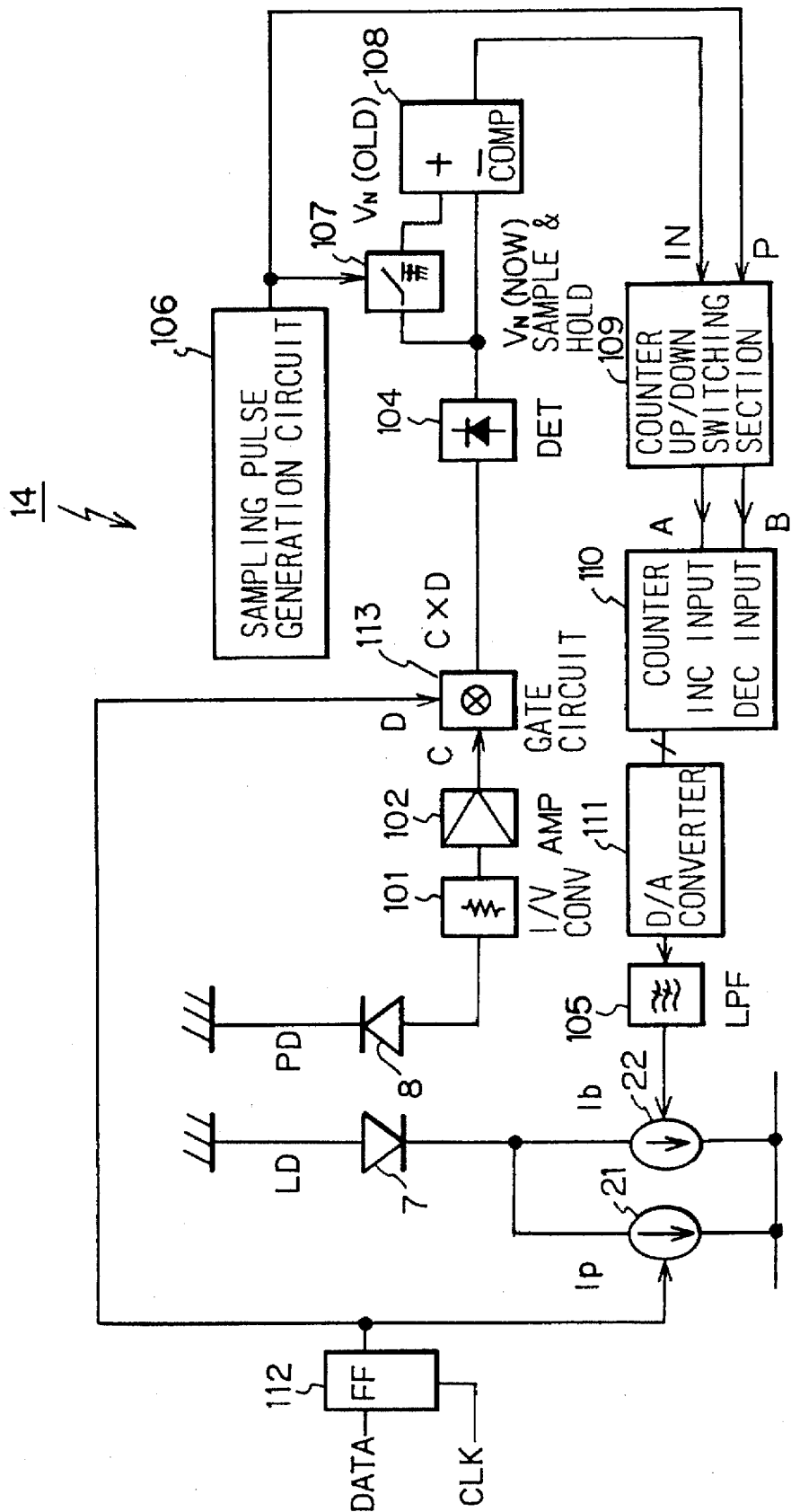
FIG. 16 is a circuit block diagram which shows the third embodiment of a threshold control circuit according to the present invention.

FIG. 16 is the third embodiment of the threshold control circuit according to the present invention.

The embodiment shown in FIG. 16 is a variation on the second embodiment shown in FIG. 15, the basic operation of this embodiment being the same as that of the second embodiment of the present invention.

The difference with respect to the embodiment shown in FIG. 15 is that, in place of the bandpass filter 103 for the purpose of extracting the 2n*fo components, a gate circuit 113 is provided, this gating circuit closing when a "1" signal is transmitted and opening when "0" signal is transmitted there is no signal (that is, when there is noise).

During transmission of a digital signal, because a digital signal of a large amplitude is added in the region of the threshold point C, if 2n*fo components are superimposed when the digital signal is at the "1" state, there is a chance that the noise peak point, which is shown in FIG. 14b, will become indeterminate. To avoid this, the gating circuit 113 is closed only during the time at which the transmitted signal is "1," thereby removing the digital signal component. By doing this, thereby passing only the noise components, it is possible to achieve more reliable tracking of Ith. It is also possible to use a combination of the bandpass filter 103 for extracting 2n*fo components, which is shown in FIG. 15, and the gate circuit 113 of this embodiment for even more precise noise extraction.

Figure 17:
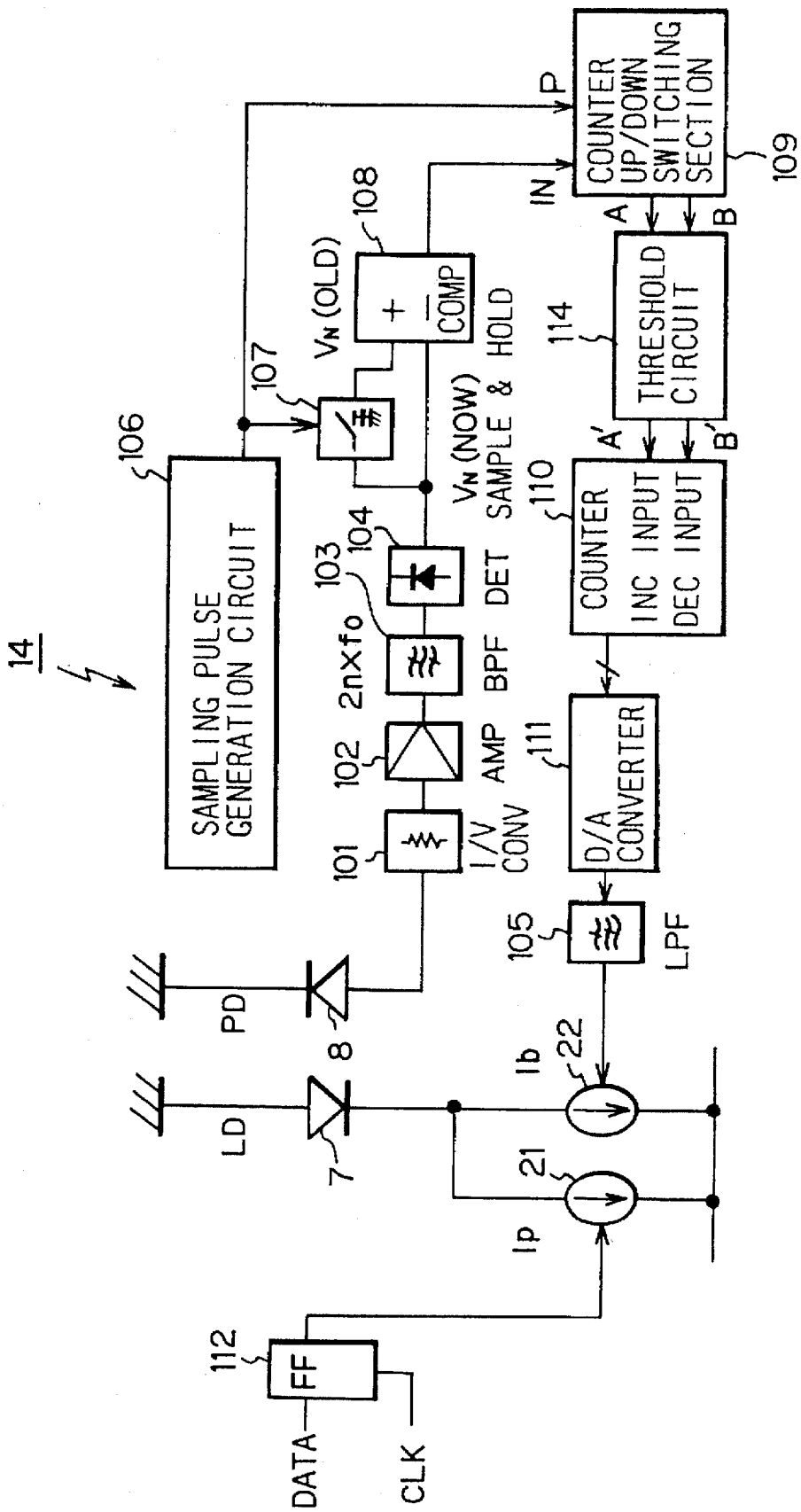
FIG. 17 is a circuit block diagram which shows the fourth embodiment of a threshold control circuit according to the present invention.

FIG. 17 shows the fourth embodiment of the threshold control circuit according to the present invention.

This embodiment shown in FIG. 17 is also another form of the second embodiment, which is shown in FIG. 15, the basic operation of this embodiment being the same as that of the second embodiment of the present invention.

The difference with respect to the embodiment shown in FIG. 15 is the addition of a counter threshold circuit 114 to the embodiment shown in FIG. 15. This counter threshold circuit 114 is provided to stop the random increasing and decreasing of Ib in the region of the settling point (point C). This is particularly effective in the case in which the opto-electrical conversion ratio η is high and when using a low-cost D/A converter with low resolution. This is because in such cases, with the configuration for the second embodiment shown in FIG. 15, in the region of point C, Ib can vary over a range of approximately 2*ΔIb at the most, and a deterioration of the extinction ratio can occur.

Figure 18A:
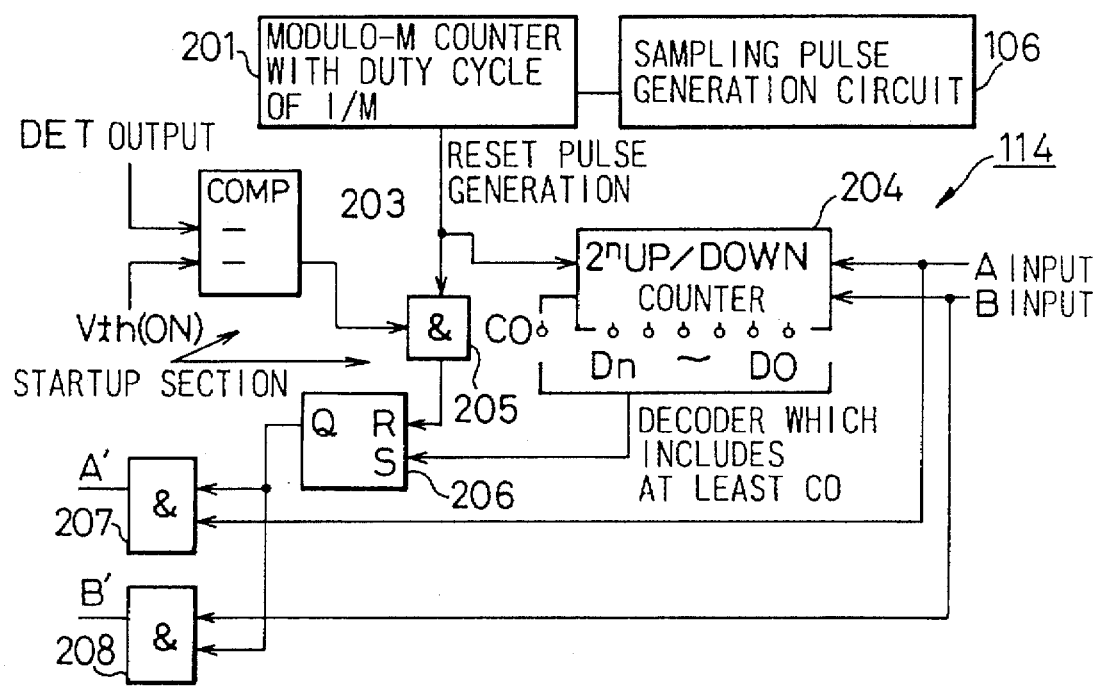
FIG. 18a is a circuit diagram which shows an example of the circuit configuration of the threshold control circuit of FIG. 17.
Figure 18B:
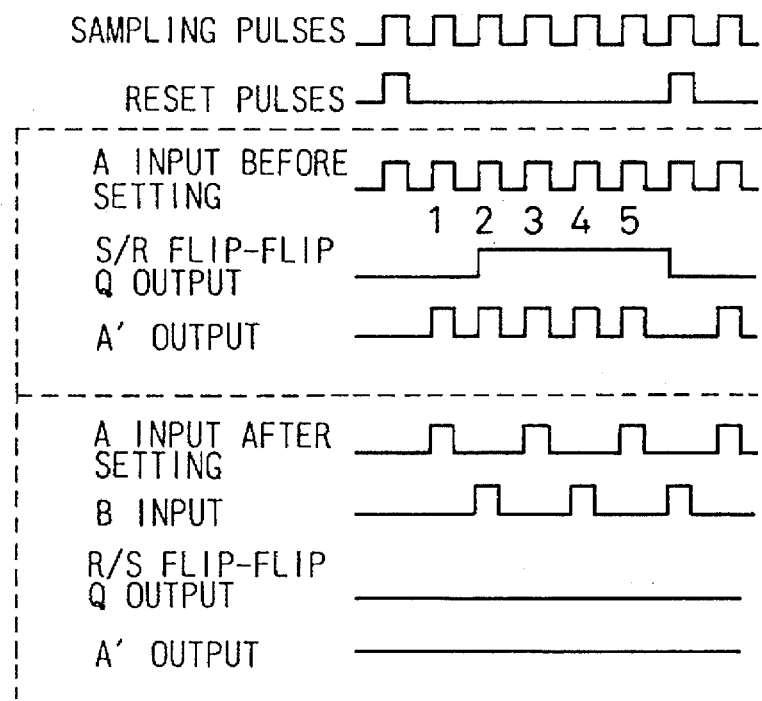

FIG. 18a and FIG. 18b show an example of a circuit configuration of the threshold circuit shown in FIG. 17, FIG. 18a being the block diagram and FIG. 18b being a timing diagram indicating the major timing.

In FIG. 18a, a modulo-M counter 201 outputs a reset pulse each time M sampling pulses arrive from the sampling pulse generation circuit 106. While the modulo-2up/down counter 204 is periodically reset by the modulo-M counter, if the difference between the count-up pulses and the count-down pulses (A−B) exceeds the count of the setting value established by D0 to Dn, the carry output signal (CO) is output. This CO signal is applied to the SET input terminal of the R/S flip-flop circuit 206, the set output Q of that circuit causing the gate circuits 207 and 208 of the count up and count down pulses (A and B) to open, operation of the main counter 110 being then started by the gate outputs (A' and B').

As long as the CO signal is not output, gate circuits 207 and 208 will remain closed, the operation of the main counter 110 will be stopped, and the count value of the main counter 110, which establishes the D/A converter output, will not be updated. Therefore, after point C is reached, Ib remains at a constant value until the value of Ith changes because of, for example temperature variations, thereby causing a disruption of the balance of the count-up pulse and the count-down pulses. To reliably start this circuit, the comparator 203, which detects when the noise level has fallen below a given value, forcibly resets the R/S flip-flop 206, thereby making operation of the threshold circuit invalid below a given noise level. The elements 203 and 206 collectively form an initial setting section.

Figure 19A:
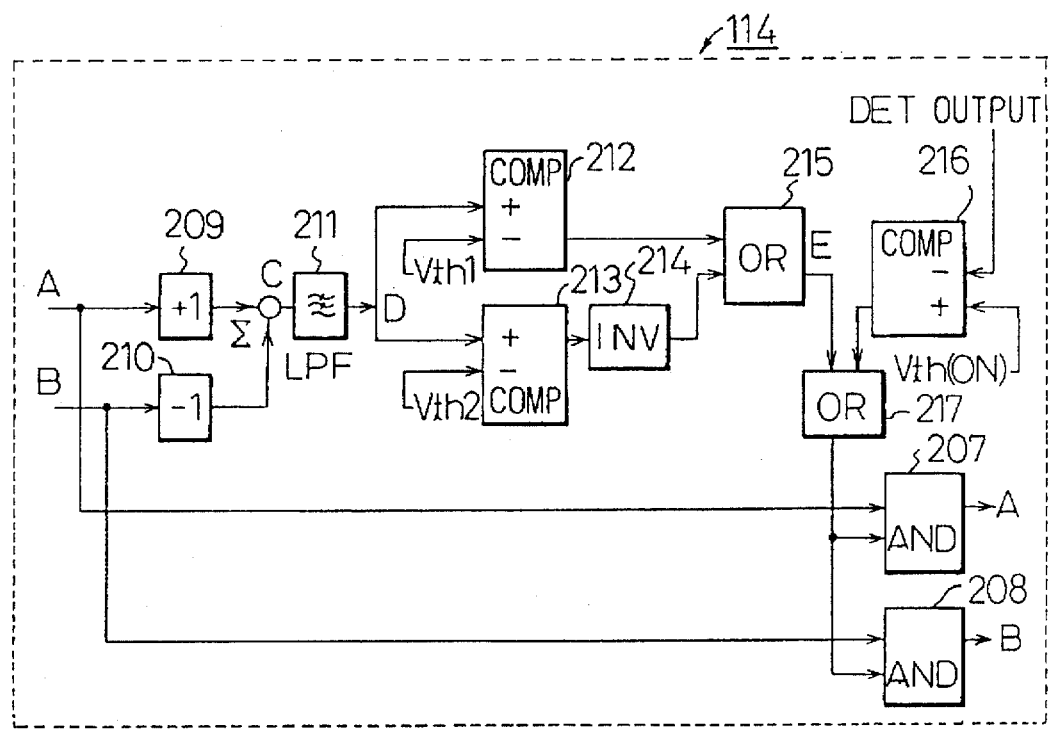
FIG. 19a is a another example of the circuit configuration of the threshold control circuit of FIG. 17.
Figure 19B:
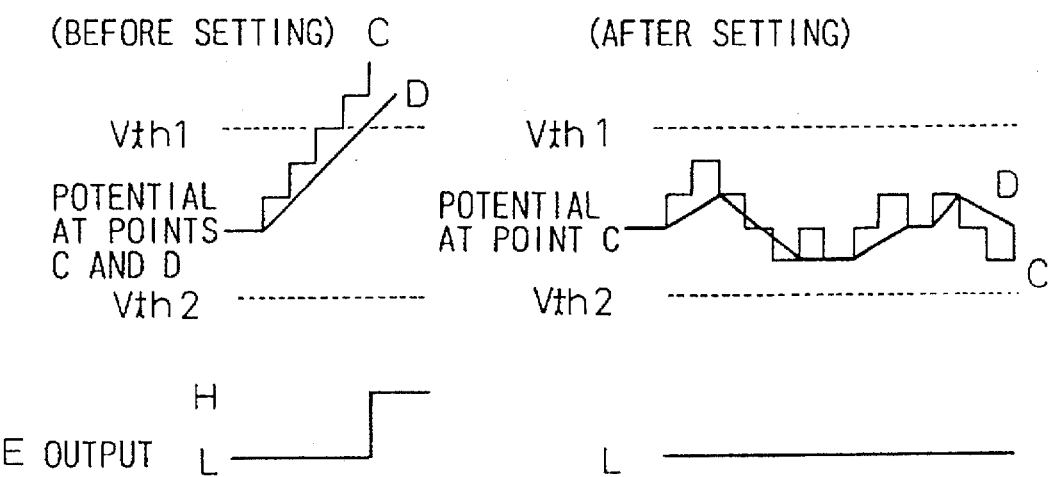

FIG. 19a and FIG. 19b show an example of a circuit configuration of the threshold circuit shown in FIG. 17, FIG. 19a being the block diagram and FIG. 19b being a drawing which illustrates the operation of the circuit. In contrast to FIG. 18a, which shows a threshold digital circuit which uses counters, this embodiment variation uses a comparator to perform analog processing.

In FIG. 19a, the A and B counting pulses are converted to analog signals having opposite amplitude characteristics by means of the +1 circuit 209 and the −1 circuit 210, respectively. Each of these signals are successively added by the next stage, an integrator (Σ), and output as a staircase waveform (the waveform C in FIG. 19b). This output is passed through a lowpass filter 211, thereby smoothing the output (solid-line waveform D in FIG. 19b).

The output of the lowpass filter 211 is input simultaneously to the comparator 212 whose upper limit threshold is set at the reference threshold value (Vth1) and to the comparator 213 whose lower limit threshold is set at the reference threshold value (Vth2). In the case in which the number of pulses per unit time is roughly the same for count-up pulses and count-down pulses, the integrator filtered output D does not exceed Vth1 or Vth2, and in this case only the output of the OR circuit 216, to which the output of each of the comparators 212 and 213 is connected, becomes low, the gate circuits 207 and 208, which were described with regard to FIG. 18a are closed, and the count in the main counter 110 is not updated. Therefore, the value of Ib is held. As was the case for FIG. 18a, in this example as well there is a comparator 216 added for the purpose of startup. The element 216 forms an initial setting section.

Figure 20:
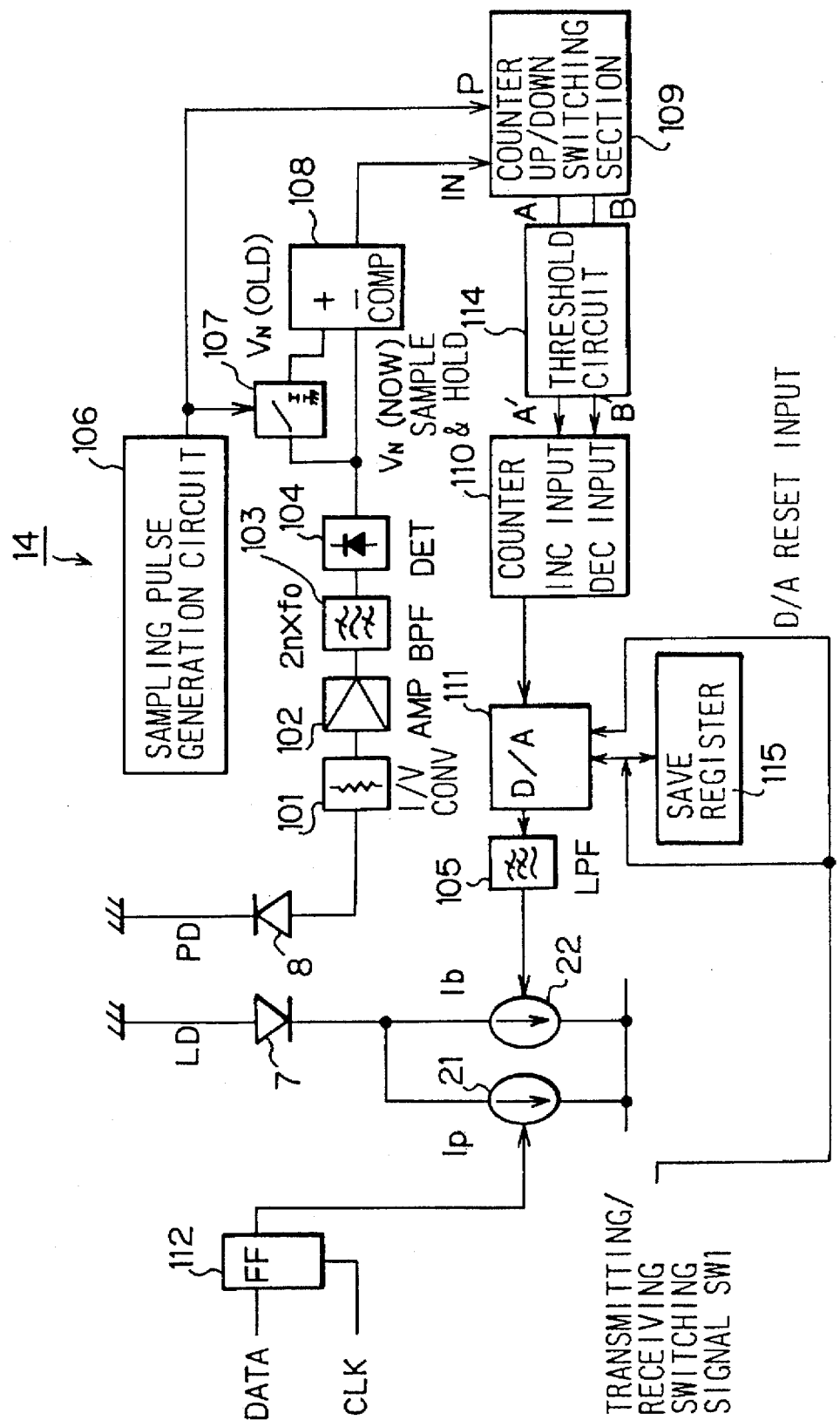
FIG. 20 is a circuit block diagram which shows the fifth embodiment of a threshold control circuit according to the present invention.

FIG. 20 is the fifth embodiment of the threshold control circuit according to the present invention.

Figure 21:
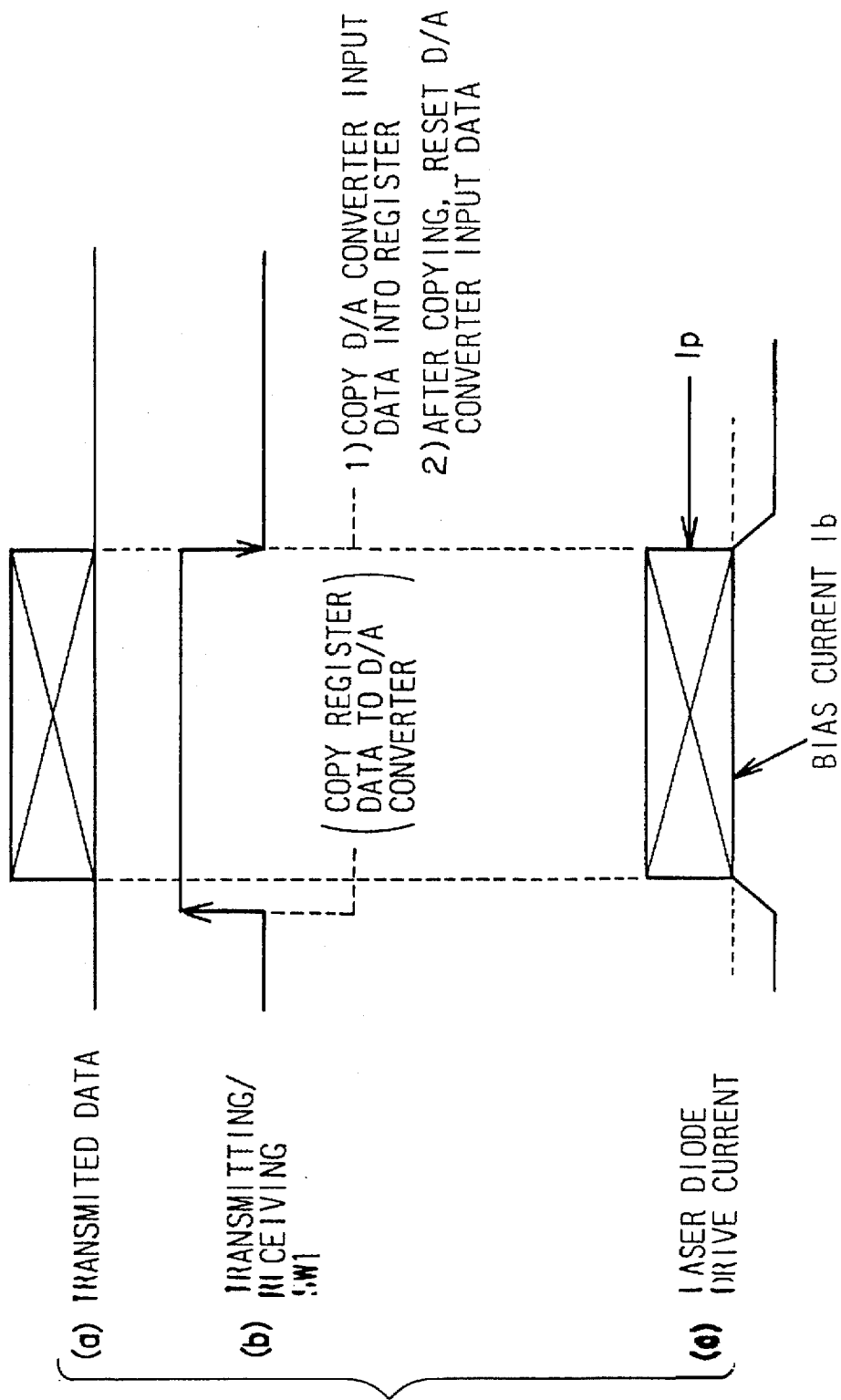
FIG. 21 is a drawing which shows the relationship between the transmitting/receiving switching signal and the laser diode drive current.

FIG. 21 is a drawing which illustrates the relationship between the transmitting/receiving switching signal and the laser diode drive current in FIG. 20.

While the basic circuit configuration of FIG. 20 is the same as the fourth embodiment, which is shown in FIG. 17, in this embodiment a circuit related to transmitting/receiving switching is added, in consideration of its use in TCM communications. As explained earlier with regard to FIG. 10a, FIG. 10b, and FIG. 11, in the TCM-TDMA system other transmitted bias optical signals are superimposed on the signal sent from a distant location, this causing the problem of a reduced I/O intensity ratio, at office X, and deterioration of transmission quality. In this embodiment, in addition to the various threshold current (Ith) tracking mechanisms, to enable application to a passive double star (PDS) configured optical transmission path as shown in FIG. 10a and FIG. 10b, a bias current on/off mechanism is provided for the purpose of preventing interference caused by bias light emission.

In FIG. 20, because the basic configuration of the Ith tracking section is the same as the fourth embodiment, which is shown in FIG. 17, the explanation of this section will be omitted. However, a save register 115 has been added in this embodiment for the purpose of saving the D/A converter 111 value immediately after the completion of transmission. The transmitting/receiving switching signal (SW1) shown in the drawing is a control signal generated internally at the transmission equipment at office X, this signal being driven high before data is transmitted, and switched to low approximately simultaneously with the transmitted data. Next, the case of the first switching from the receiving condition to transmitting will be explained (refer to FIG. 21 for the control waveforms and timing).

First, the D/A converter 111 is reset in the initial receiving condition, so that the bias current Ib is zero. Next, before the data is transmitted, when the transmitting/receiving switching signal transitions from low to high, the contents of the save register 115 are copied to the input of the D/A converter 111. Because the initial value of this is zero, the bias current rises from a value of zero. During the transmitting period, the Ith tracking operation described with regard to the fourth embodiment is performed, and Ib settles in the region of Ith. Next, at the end of the transmitting period, the transmitting/receiving switching signal transitions from high to low. When this happens, the input data in the D/A converter 111 is saved to the save register 115 and the D/A converter 111 is reset. Therefore, the bias current returns once again to zero, which prevents the generation of bias emission, which had been a problem during the receiving period. Because in the transmission operation after the first time the tracking uses the data from the previous operation as the initial value, settling is achieved in a shorter period of time.

Figure 22:
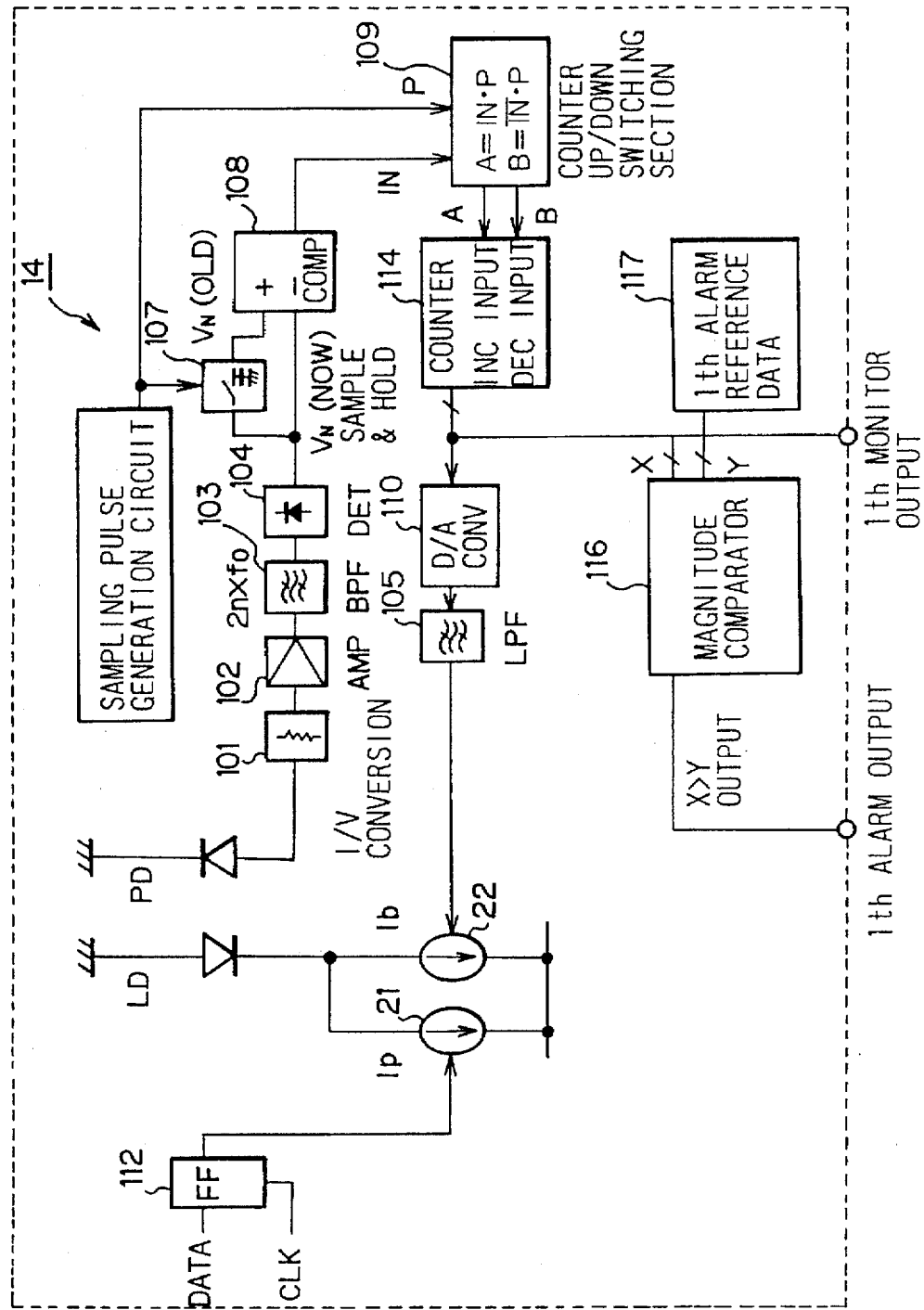
FIG. 22 is a circuit block diagram which shows an example of the configuration of the sixth embodiment of a threshold control circuit according to the present invention.

FIG. 22 shows the sixth embodiment of the threshold control circuit according to the present invention.

While the basic circuit configuration of this embodiment is the same as the second embodiment, which is shown in FIG. 15, in this embodiment an Ith monitor output and Ith alarm output, to detect laser diode deterioration, are provided in the Ith tracking circuit, and because of this addition, an Ith alarm reference data section 117 and a magnitude comparator 116 are added.

Even with today's advanced manufacturing technology, because the reliability of optical components is low when compared to digital circuit components, a variety of monitor output terminals are provided on transmitting/receiving modules to detect the device deterioration, to enable replacement or repair before communications are completely cut off. In a transmitting module, a laser diode drive current monitor is provided as one such monitor. However, to enable such an analog monitor to be accommodated by communications devices, which are basically digital circuits, it is necessary to perform conversion to digital signals, inside or outside of the transmission/receiver modules, using A/D converter.

In this embodiment, because a D/A converter is already employed to perform Ib control, if the input digital signal of D/A converter 110 is output as is, it is possible for the communications equipment to read this in as the Ith monitor data. Also, if the Ith upper limit value is stored beforehand in the Ith alarm reference data section 117, and a comparison is made between this value and the input digital signal to the D/A comparator 110, it is possible to provide an Ith alarm output signal.

The above have been detailed descriptions of the threshold control circuit and variations thereon of a optical communications module according to the present invention.

Next, detailed descriptions of the configurations of the transmitting/receiving switching mechanism and the bi-directional optical module for the purpose of using this switching in a optical communications module according to the present invention related to the TCM system, is provided.

Figure 23:
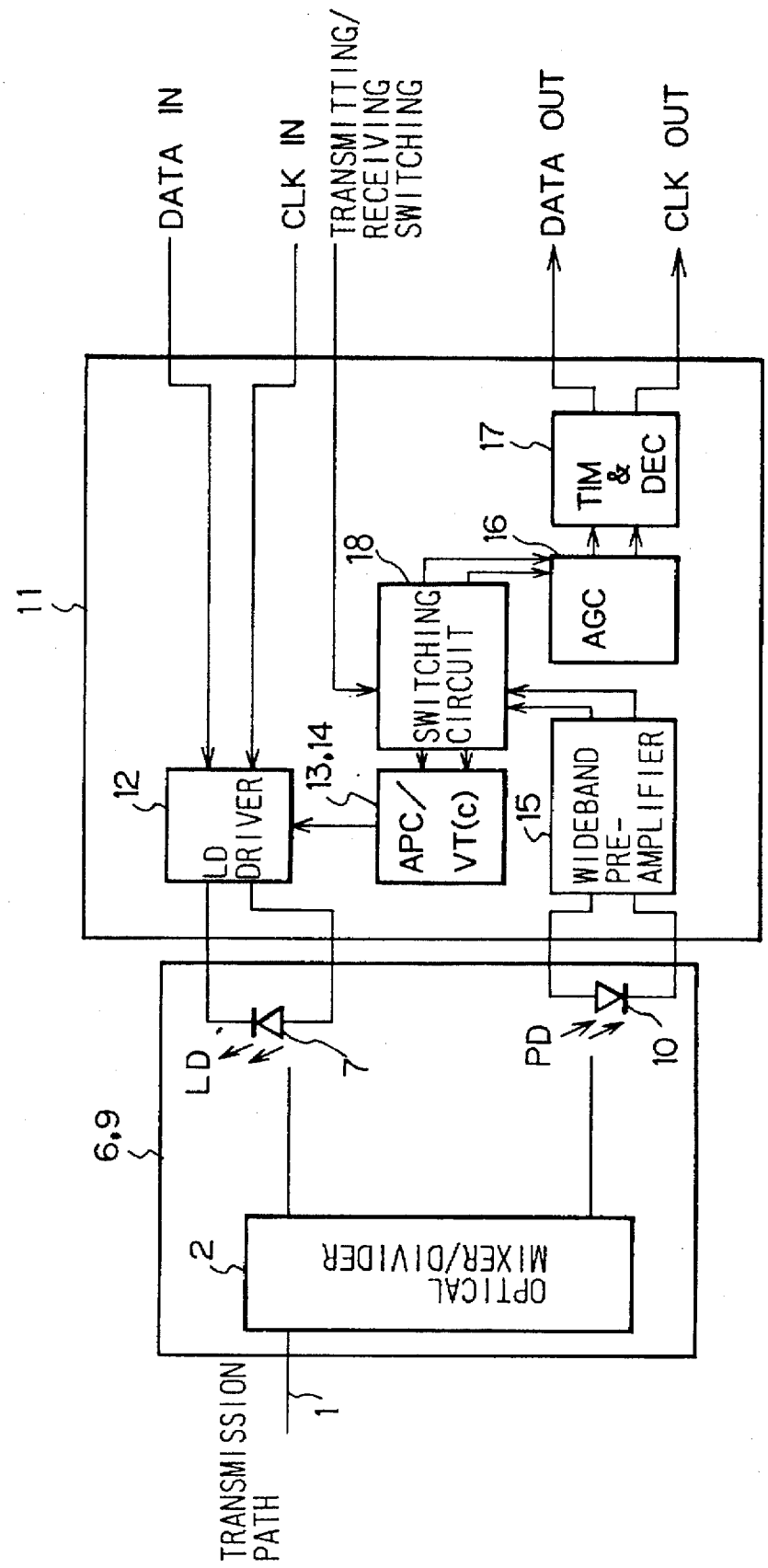
FIG. 23 is a circuit block diagram which show an example of the configuration of an optical communications module into which is inserted a transmitting/receiving switching circuit.
Figure 24:
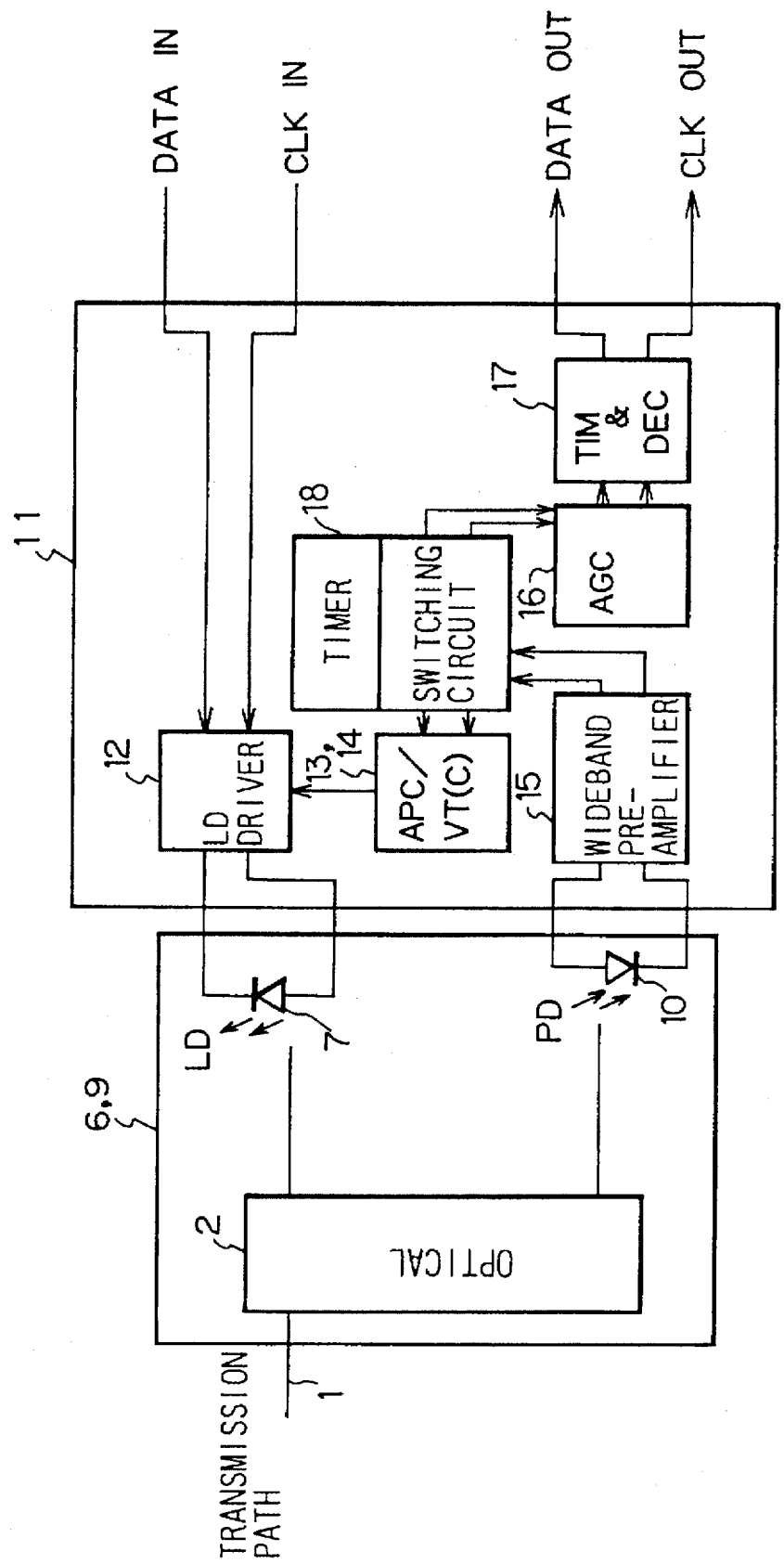
FIG. 24 is a circuit block diagram which shows another example of the configuration of an optical communications module into which is inserted a transmitting/receiving switching circuit.

FIG. 23 and FIG. 24 are block diagrams which each show a configuration of an optical communications module into which a transmitting/receiving switching circuit has been inserted.

In FIG. 23 and FIG. 24, blocks which are functionally the same as the various circuit blocks shown in FIG. 1 have been assigned the same reference symbols and will not be described here. To simplify the drawings, the APC circuit 13 and threshold control circuit 14 have be shown as a single block.

In FIG. 23, the case in which the transmitting/receiving switching circuit 18 is externally controlled by means of a transmitting/receiving switching signal applied from the communications equipment is shown. During the transmitting period, the transmitting/receiving switching circuit 18, as shown in the APC circuit of FIG. 13 and in the fifth embodiment of FIG. 20, controls the threshold control circuit 14, and stops controlling the AGC circuit 16 in the receiving section. During the receiving period, however, it stops controlling the APC circuit 13 and the threshold control circuit 14 and controls the AGC circuit 16.

In this embodiment, taking advantage of the use of transmitting/receiving switching, which is a characteristic of the TCM system, the transmitted light output from the laser diode 7 is passed through an optical coupler 2 and monitored by the photodiode 10, thereby eliminating the separate monitor photodiode provided in prior art transmitting sections. By doing this, it is possible to achieve not only the integration of transmitting/receiving module 6,9, but also compactness and low cost. In addition, by monitoring the actual light transmission output, it is possible to accurately and reliably detect a variety of output failures, such as cutoff of output and laser diode deterioration.

In addition, in addition to having the transmitting/receiving switching circuit 18 of FIG. 23 provide control signals for the purpose of transmitting/receiving switching to the APC circuit 13, the threshold control circuit 14, and the AGC circuit 16, it also has, in the transmitting period illustrated in FIG. 3, a path switching function which switches the paths of the transmitted light monitored by the photodiode 10 of the receiving section to the APC circuit 13 and the threshold control circuit 14. By means of this configuration, the output of the wideband pre-amplifier 15 of the receiving section can be used in the APC circuit 13.

Although the example shown in FIG. 24 is similar to the above-described example shown in FIG. 23, in this case the difference with respect to the example of FIG. 23 is that elements such as a timer are used within the optical communications module to enable independent automatic transmitting/receiving switching.

Similar to the example shown in FIG. 23, by means of this configuration of the present invention, even without the photodiode that was used in the laser diode module, it is possible to perform APC control, and the ability to monitor the forward-direction light output from the laser diode 7 means that the actual transmitted light is monitored, thereby enabling accurate and reliable detection of conditions such as cutoff of light output and laser diode deterioration. Also, by eliminating the monitor photodiode within the laser diode, it is possible to achieve a cost reduction, compactness, and the integrated implementation of the transmitting/receiving sections.

FIGS. 25 to 28 show examples of the configuration of the transmitting/receiving section 6,9 of the present invention which is implemented with transmitting and receiving elements in same unit. In each of these drawings, although a variety of elements is used as the optical mixer/divider 2, these are all assigned the reference symbol 2, to clarify the relationship between them.

Figure 25:
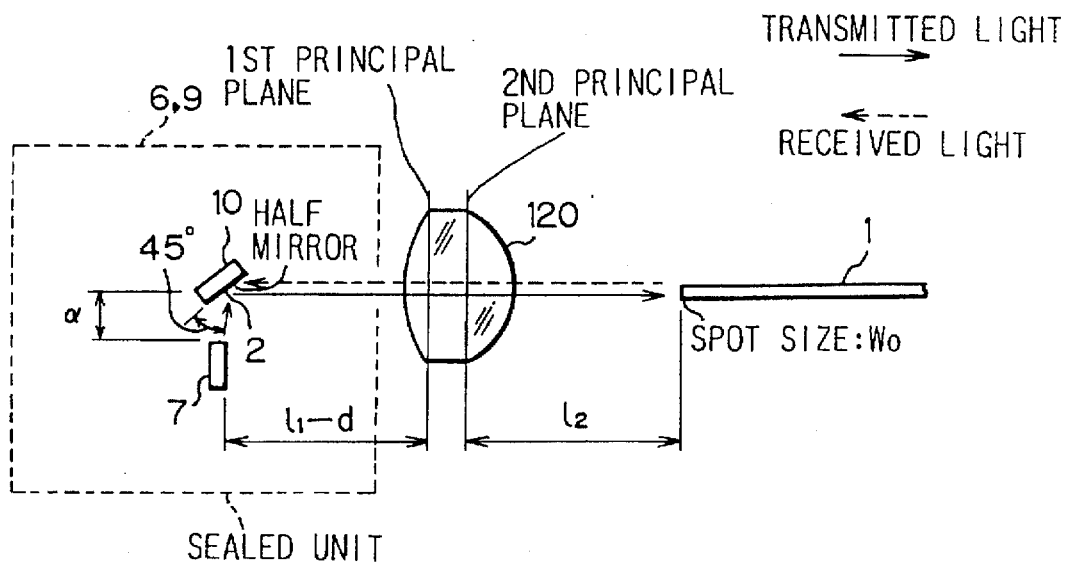
FIG. 25 is a drawing which shows an example configuration (1) of a single combination transmitting/receiving optical communications module according to the present invention.

FIG. 25 shows the construction of a unitized combination of the optical transmitting/receiving sections 6,9 in which a photodiode chip 10 with a coupler film applied to it is inclined at 45° to the front of the laser diode chip 7.

In FIG. 25, of the light emitted from the laser diode 7, the component which passes through the semi-transparent coupler film (half mirror) 2 provided on the light-receiving surface of the photodiode 10 passes through lines 120 and strikes fiber 1. On the other hand, component of the signal light that is output from the fiber 1 and passes through the coupler film 2 is received by the photodiode 10 as the received signal. In the case of this embodiment, by monitoring the forward direction light output from the laser diode 7, the rear emission of light from the laser diode 7 is unnecessary, this having the advantage of making possible the achievement of a high-output laser diode, something that was difficult with conventional laser diodes.

In the case of this configuration, the spot size $w_1$ of the fiber light output on the photodiode surface is given by the following equation (1)

$$\omega_1 = \frac{l_1}{l_2} \omega_0 \sqrt{1 + \left(\frac{d}{b_0}\right)^2} \quad \text{1)}$$

$$b_0 = \frac{\pi}{\lambda} \left(\frac{l_1}{l_2} \omega_0\right)^2 \quad \text{2)}$$

For example, if the various parameters shown in FIG. 25 are $w_0$=5 μm, light wavelength l=1.31 μm, $l_1$=2 mm, and $l_2$=5 mm, from Equation (1), the relationship becomes $w_1$=0.21 d. From this, to satisfy the relationship $\phi > 2w_1$ for the purpose of increasing the incidence efficiency of the photodiode with respect to the light-receiving radius $\phi$, for $\phi$=100 μm, it would be acceptable to make the distance between the laser diode and the photodiode chips be within 240 μm, and this is an achievable value.

Figure 26:
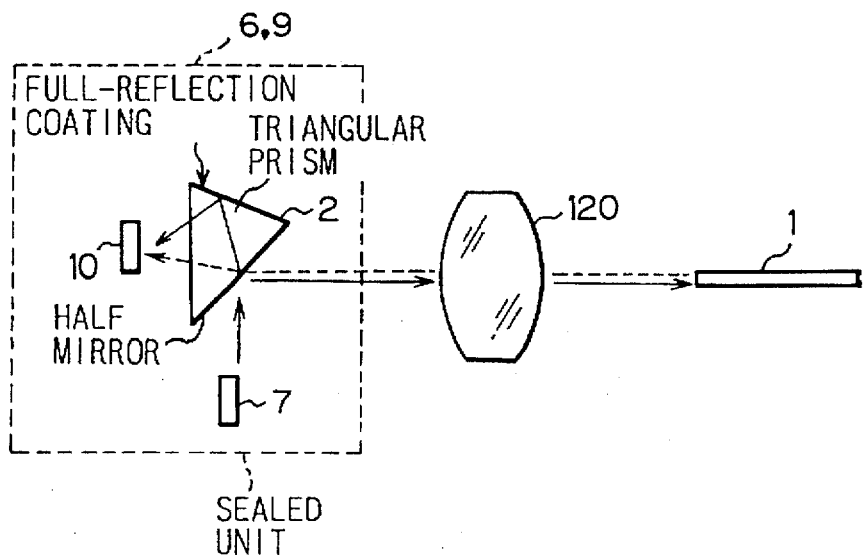
FIG. 26 is a drawing which shows an example configuration (2) of a single combination transmitting/receiving optical communications module according to the present invention.

FIG. 26 shows the construction in the case in which a triangular prism 2 having a coupler film and full-reflection film applied to it is positioned between the laser diode 7 and the photodiode 10.

The component of the light output from the laser diode 7 which passes through the coupler film is refracted, passes through the prism, is reflected by the full-reflection film and strikes the photodiode 10 as the monitor light. On the other hand, the component of the signal light which is output from the fiber 1 and which passes through the coupler film is refracted and strikes the photodiode 10 as the received signal. In this example, there is the advantage that the laser diode 7 and the photodiode 10 can be mounted mutually parallel.

Figure 27:
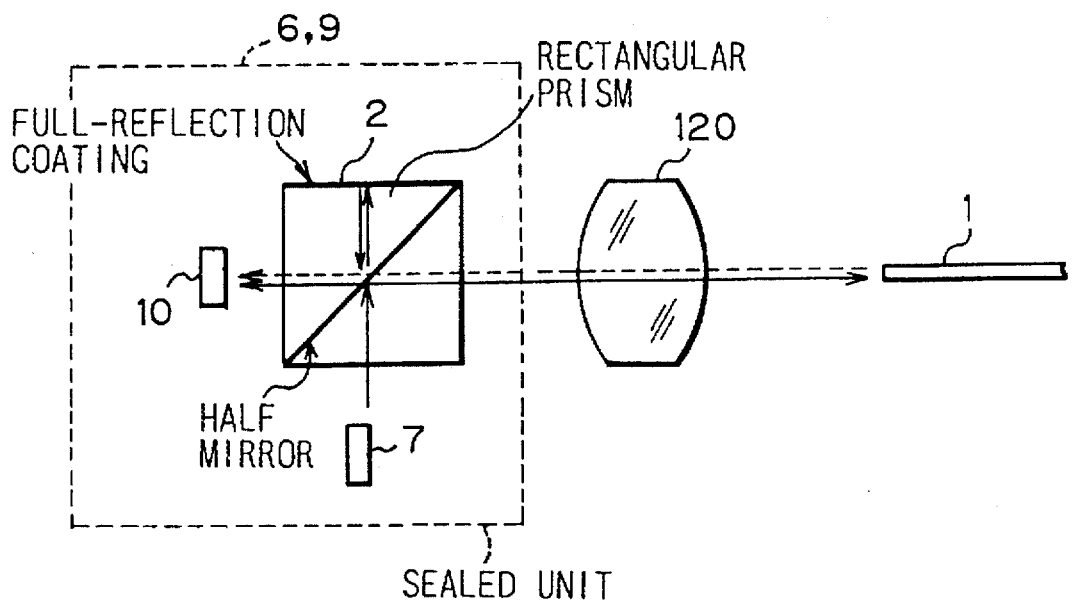
FIG. 27 is a drawing which shows an example configuration (3) of a single combination transmitting/receiving optical communications module according to the present invention.

FIG. 27 shows the construction in the case in which a rectangular prism 2 having a coupler film and full-reflection film applied to it is positioned between the laser diode 7 and the photodiode 10.

The basic operation in the case of FIG. 27 is the same as described above for FIG. 26. However, when using this configuration, it is possible to make the mounting directions the same for not only the laser diode 7 and the photodiode 10 the same, but also for the prism 2.

Figure 28:
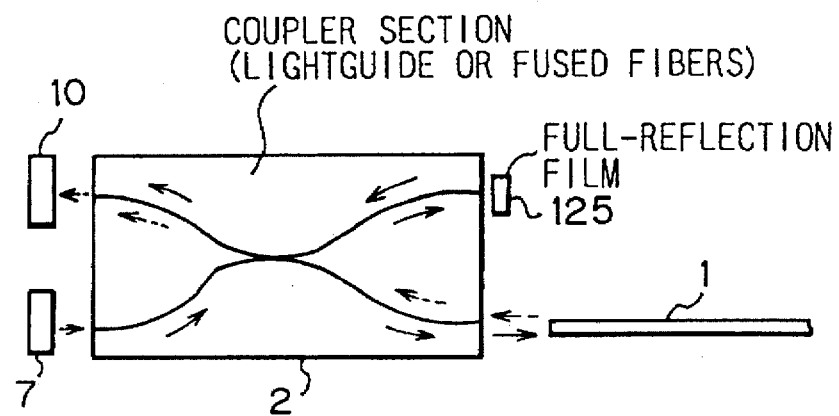
FIG. 28 is a drawing which shows an example configuration (4) of a single combination transmitting/receiving optical communications module according to the present invention.

FIG. 28 shows the construction for the case in which a lightguide 2×2 coupler or a fused fiber coupler is used as the optical mixer/divider.

In FIG. 28, the laser diode 7 and photodiode 10 are positioned at the input/output ports of the 2×2 coupler 2, with the fiber being positioned at one of the input/output ports at the other end, and a full-reflection film 125 position at the other input/output port. In this case, the light output from the laser diode 7 is split into two parts within the coupler, with one part of the light being input to the fiber 1, and the other part of the light being reflected by the full-reflection film 125 and further split into two parts inside the coupler and caused to strike the photodiode 10. For example, using a 3-dB coupler, the ratio of light from the laser diode 7 received at the photodiode 10 is 25%, and the ratio of light input to the fiber 1 is 50%.

In all of the embodiments described above, the coupling efficiency of the laser diode and the photodiode can be changed by changing the dividing ratio of the coupler 2.

As described above, in an optical communications module according to the present invention, because the laser diode bias current (Ib) is caused to track the threshold current (Ith), testing and adjustment of the optical communications module are extremely easy. By means of the tracking, it is not necessary to determine the temperature characteristics of Ith, thereby enabling a reduction in manufacturing cost of the optical communications module.

In particular when using this optical communications module in a TCM system, the present invention eliminates the need for a monitor photodiode within the laser diode, thereby making possible the combination of receiving and transmitting modules into a single module, the achievement of compactness, and a reduction in cost. In addition, because the forward-direction light output of the laser diode is monitored, it is possible to perform, accurately and easily, detection of cutoff of the actual transmitted light and laser diode deterioration.

What is claimed is:

1. An optical communications module, comprising:
   a transmitting/receiving section which sends a transmitted signal to a transmission path as an optical signal and receives an optical signal from said transmission path; and
   a drive section, which applies said transmitted signal to the transmitting/receiving section and reproduces said received optical signal applied from the transmitting/receiving section as a received electrical signal,
   wherein said transmitting/receiving section includes a laser diode that outputs the optical signal transmitted to the transmission path and a photo diode for monitoring the optical signal output from the laser diode, and said drive section includes a threshold control circuit which controls a bias current of said laser diode so that an optical noise output from said laser diode, which is detected by said photodiode, is maximized, thereby causing the bias current value of the laser diode to be equal to and track a threshold current value.

2. An optical communications module according to claim 1, wherein said threshold control circuit comprising:
   an I/V conversion circuit which converts the monitor current from said photodiode to a voltage;
   an amplifier circuit which amplifies said voltage converted from said optical noise output to the required level;
   a bandpass filter which passes components of said transmitted signal which are even multiples of the clock frequency fo (2n*fo, where n is an integer);
   a detection circuit which outputs a rectified output of said bandpass filter;
   an amplifier which amplifies the difference between the rectified output of said detection circuit and a required reference value so that the optical noise output of said laser diode is maximum; and
   a bias current control circuit which controls the bias current of said laser diode in accordance with the output of said amplifier.

3. An optical communications module comprising:
   a transmitting/receiving section which sends a transmitted signal to a transmission path as an optical signal and receives an optical signal from said transmission path; and
   a drive section, which applies said transmitted signal to the transmitting/receiving section and reproduces said receives optical signal applied from the transmitting/receiving section as a received electrical signal,
   wherein said transmitting/receiving section includes a laser diode that outputs the optical signal transmitted to the transmission path and a photo diode for monitoring the optical signal output from the laser diode, and said drive section includes a threshold control circuit which controls a bias current of said laser diode so that an optical noise output from said laser diode, which is detected by said photodiode, is maximized, thereby causing the bias current of the laser diode to track a threshold current value,
   an I/V conversion circuit which converts the monitor current from said photodiode to a voltage;
   an amplifier circuit which amplifies said voltage converted from said optical noise output to a selected level;
   a bandpass filter which passes components of said transmitted signal which are even multiples of the flock frequency fo;
   a detection circuit which outputs a rectified output of said bandpass filter;
   a sampling pulse generation circuit which generates a clock for the purpose of sampling the rectified output of said detection circuit;
   a sampling and hold circuit which samples and holds said rectified output in accordance with the sampling clock from said sampling pulse generation circuit;
   a comparator which compares the rectified output from said detection circuit with the sampled and held value from the previous clock cycle, from said sample and hold circuit to detect the increase on decrease in said optical noise components;
   an up/down controllable counter which counts said sampling clock pulses;
   a counter up/down switching section which uses the output of said comparator to control the up-counting and down-counting of said counter so that said optical noise components are maximized;
   a D/A converter which performs digital-to-analog conversion of the count output of said counter;
   a lowness filter which smooths the output of said D/A converter; and
   a bias current control circuit which controls the bias current of said laser diode in accordance with the output of said lowpass filter.

4. An optical communications module according to claim 3, wherein said threshold value control circuit uses, in place of said bandpass filter, a gate circuit which passes the output of said amplifier which amplifies said voltage converted from said optical noise output to the required level only when the transmitted signal data is zero.

5. An optical communications module according to claim 3, wherein said threshold control circuit has not only said bandpass filter, but also further comprises a gate circuit which passes the output of said amplifier which amplifies said voltage converted from said optical noise output to the selected level only when the transmitted signal data is zero.

6. An optical communications module according to claim 3 in which, in a bi-directional communications system which performs time-division switching between transmitting and receiving, said threshold control circuit further comprises a save register into which the input value to said D/A converter is saved after the completion of the transmitting period and from which the saved value is set, as the input value of said D/A converter, before the next start of next transmitting period.

7. An optical communications module, according to claim 3, in which said threshold control circuit further comprises a monitor terminal which directly outputs the input of said D/A converter, and/or an alarm terminal, from a magnitude comparator and which compares said D/A comparator input with the required alarm value and produces an output.

8. An optical communications module, according to any one of claims 3 and 5, wherein said threshold circuit which provides upper and lower region threshold values of the maximum point of said optical noise frequency components, and which stops the counting of said counter when the noise level is between these threshold values.

9. An optical communications module according to claim 8, wherein said threshold circuit has a second counter which counts the difference between the count up count of said counter and the count-down count of said counter, said second counter stopping the counting of said counter when the difference is smaller than a selected value.

10. An optical communications module according to claim 8, wherein said threshold circuit has an integration circuit which accumulates the count-up pulses and the reverse-polarity count-down pulses from said counter, said integration circuit output causing said counter to stop when the accumulated value is within the specified values.

11. An optical communications module according to claim 9, wherein said threshold circuit further has an initial setting section which forcibly disables operation of said threshold circuit when power is applied.

12. An optical communications module according to claim 11, wherein said initial setting section becomes operative when the rectified output from said detection circuit is below a relatively small value.

\* \* \* \* \*